US008280878B2

(12) United States Patent
Warnock et al.

(10) Patent No.: US 8,280,878 B2
(45) Date of Patent: Oct. 2, 2012

(54) METHOD AND APPARATUS FOR REAL TIME TEXT ANALYSIS AND TEXT NAVIGATION

(75) Inventors: Christopher M. Warnock, Los Altos, CA (US); Tom J. Santos, San Jose, CA (US); Richard M. Holzgrafe, San Jose, CA (US); Jay C. Nolan, Sunnyvale, CA (US)

(73) Assignee: Ebrary, Inc., Palo Alto, CA (US)

( * ) Notice: Subject to any disclaimer, the term of this patent is extended or adjusted under 35 U.S.C. 154(b) by 93 days.

(21) Appl. No.: 12/726,296

(22) Filed: Mar. 17, 2010

(65) Prior Publication Data
US 2010/0235353 A1    Sep. 16, 2010

Related U.S. Application Data

(63) Continuation of application No. PCT/US2010/026853, filed on Mar. 10, 2010.

(60) Provisional application No. 61/158,960, filed on Mar. 10, 2009, provisional application No. 61/183,690, filed on Jun. 3, 2009.

(51) Int. Cl.
*G06F 17/30* (2006.01)

(52) U.S. Cl. ........................................ 707/723

(58) Field of Classification Search .................. None
See application file for complete search history.

(56) References Cited

U.S. PATENT DOCUMENTS

| 6,070,158 | A  | 5/2000 | Kirsch et al. |
| 6,233,586 | B1 | 5/2001 | Chang et al. |
| 6,246,977 | B1 | 6/2001 | Messerly et al. |
| 6,272,488 | B1 | 8/2001 | Chang et al. |
| 6,578,046 | B2 | 6/2003 | Chang et al. |
| 7,194,490 | B2 | 3/2007 | Zee |
| 2002/0026443 | A1 | 2/2002 | Chang et al. |
| 2004/0093328 | A1 | 5/2004 | Damle |
| 2004/0181525 | A1 | 9/2004 | Itzhak et al. |
| 2005/0131872 | A1 | 6/2005 | Calbucci et al. |

(Continued)

FOREIGN PATENT DOCUMENTS

EP    1852793 A2    11/2007

(Continued)

OTHER PUBLICATIONS

"Building a better search query—through content minin"; May 2008; Computer in Libraries, vol. 28, No. 5, pp. 32-33, USA.

(Continued)

*Primary Examiner* — Bai D. Vu
(74) *Attorney, Agent, or Firm* — Michael A. Glenn; Glenn Patent Group

(57) ABSTRACT

An end user, by way of a submission interface, instructs an engine to select particular collections of documents to process. The engine processes all the text from within all the documents from within the selected collections. The result of the processing of such text is a distilled data set. Such distillate data set is accessed through APIs by a browser. Different views of the accessed distillate data set may be presented to the end user via the browser allowing them to more effectively assess the utility of the presented data and thereby responsively tune the presented data set with regard to their particular research task. One or more of such views may be used to create a new document from sentences, paragraphs, chapters or documents from the distillate data set that correspond to the one or more views for presentation to the end user.

10 Claims, 20 Drawing Sheets

U.S. PATENT DOCUMENTS

| | | | |
|---|---|---|---|
| 2005/0149496 | A1 | 7/2005 | Mukherjee et al. |
| 2005/0289124 | A1 | 12/2005 | Kaiser et al. |
| 2006/0200461 | A1 | 9/2006 | Lucas et al. |
| 2006/0200556 | A1 | 9/2006 | Brave et al. |
| 2007/0055680 | A1 | 3/2007 | Statchuk |
| 2007/0055691 | A1 | 3/2007 | Statchuk |
| 2007/0061247 | A1 | 3/2007 | Ramer et al. |
| 2007/0112763 | A1 | 5/2007 | Broder et al. |
| 2008/0189262 | A1 | 8/2008 | Peng |
| 2008/0270434 | A1 | 10/2008 | Gosby et al. |

FOREIGN PATENT DOCUMENTS

| | | |
|---|---|---|
| EP | 1852794 A2 | 11/2007 |
| EP | 1855218 A2 | 11/2007 |
| EP | 1855219 A2 | 11/2007 |

OTHER PUBLICATIONS

"Federated search. One simple query or simply wishful thinking?"; Jul. 2008; Searcher, vol. 16, No. 7, pp. 22-24 and 61-62.

Callan, et al.; "Query-Based Sampling of Text Databases"; Apr. 2001; ACM Transactions on Information Systems, vol. 19, issue 2, 6 pages.

Callan, et al.; "Searching Distributed Collections With Inference Networks"; to appear Jul. 1995 at the 18th Annual Int'l ACM SIGIR Conference on Research and Development in Information Retrieval, 8 pages, Seattle, Washington.

The Int'l Search Report and Written Opinion, mailed Apr. 28, 2010, in related PCT application PCT/US10/26853, 18 pages.

Croft, et al.; "Collaborative Research—Digitial Government: A Language Modeling Approach to Metadata for Cross-Database Linkage and Search"; May 2004; National Conference on Digital Government Research, pp. 1-2, Seattle, Washington.

Fingerman, S.; "Scitopia: worthy effort; worth your effort? [Web-based federated search portal]"; Jul.-Aug. 2008; Online, Inc., vol. 32, No. 5, pp. 28, 30, USA.

Goncalves, et al.; "MARIAN Searching and Querying across Heterogeneous Federated Digital Libraries"; Dec. 2000; ERCIM Workshop on Information Seeking, Searching and Querying in Digital Libraries; 6 pages; Zurich, Switzerland.

Graupmann, et al.; "Towards Federated Search Based on Web Services"; Feb. 2003, BTW 2003, pp. 384-393, Germany.

Gravano, et al.; "STARTS: Stanford Proposal for Internet Meta-Searching"; May 1997; ACM Int'l Conference on Management of Data (SIGMOD 1997) 12 pages, Tucson, Arizona.

Hatala, et al.; "The Interoperability of Learning Object Repositories and Services: Standards, Implementations and Lessons Learned"; May 2004; ACM WWW 2004, New York, New York, pp. 19-27.

Joint, N.; "Managing the implementation of a federated search tool in an academic library"; 2009; Library Review, vol. 58, No. 1, pp. 11-16.

Kashyap, et al.; "Semantic and Schematic Similarities between Database Objects: A context-based approach"; Sep. 1995, published 1996; VLDB Journal, vol. 5, pp. 276-304.

Kwok, et al.; "MatSeek: an ontology-based federated search interface for materials scientists"; Jan.-Feb. 2009; IEEE Intelligent Systems, vol. 24, No. 1, pp. 47-56, USA.

Liu, et al.; "Arc—An OAI Service Provider for Cross-Archive Searching"; Jun. 24-28, 2001; ACM JCDL '01, Roanoke, Virginia, 2 pages.

Lu, et al.; "Reducing Storage Costs for Federated Search of Text Databases"; May 2003; ACM Nat'l Conference on Digital Government Research, vol. 130, pp. 1-4, Boston, Massachusetts.

Mohamed, et al.; "Web usage mining analysis of federated search tools for Egyptian scholars"; 2008; Program: Electronic Library and Information Systems, vol. 42, No. 4, pp. 418-435.

Myllymaki, Jussi; "Effective Web Data Extraction with Standard XML Technologies"; May 2001; ACM WWW10, Hong Kong, pp. 689-696.

Renda, et al.; "The Robustness of Content-Based Search in Hierarchical Peer to Peer Networks"; Nov. 2004; ACM CIKM '04; Washington DC, USA, 9 pages.

Sanders, B.; "Op Ed: prescription vs. descirption in the information-seeking process, or should we cincourage our patrons to use Google Scholar?"; Jun. 2008; Against the Grain, vol. 20, No. 3, p. 48.

Si, et al.; "A Semisupervised Learning Method to Merge Search Engine Results"; Oct. 2003; ACM Transactions on Information Systems, vol. 21, No. 4, pp. 457-491.

Si, et al.; "Distributed Information Retrieval With Skewed Database Size Distributions"; May 2003; ACM Int'l Conference on Digital Government Research, vol. 130, pp. 1-6; Boston, Massachusetts.

Suleman, et al.; "The Open Archives Initiative: Realizing Simple and Effective Digital Library Interoperability"; 2002; Journal of Library Administration, vol. 35, Nos. 1-2, pp. 125-145.

Xu, et al.; "Cluster-based Language Models for Distributed Retrieval"; Aug. 1999; ACM SIGIR '99; Berkeley, California, pp. 254-261.

Joint, N.; "Federated Search Engines and the Development of Library Systems"; 2008; Library Review, vol. 57, No. 9, pp. 653-659, UK.

Hammouda et al. "Phrase-based Document Similarity Based on an Index Graph Model"; Proceedings of the 2002 IEEE International Conference on Data Mining (online), Dec. 2002 (retrieved on Apr. 18, 2010), pp. 203-221.

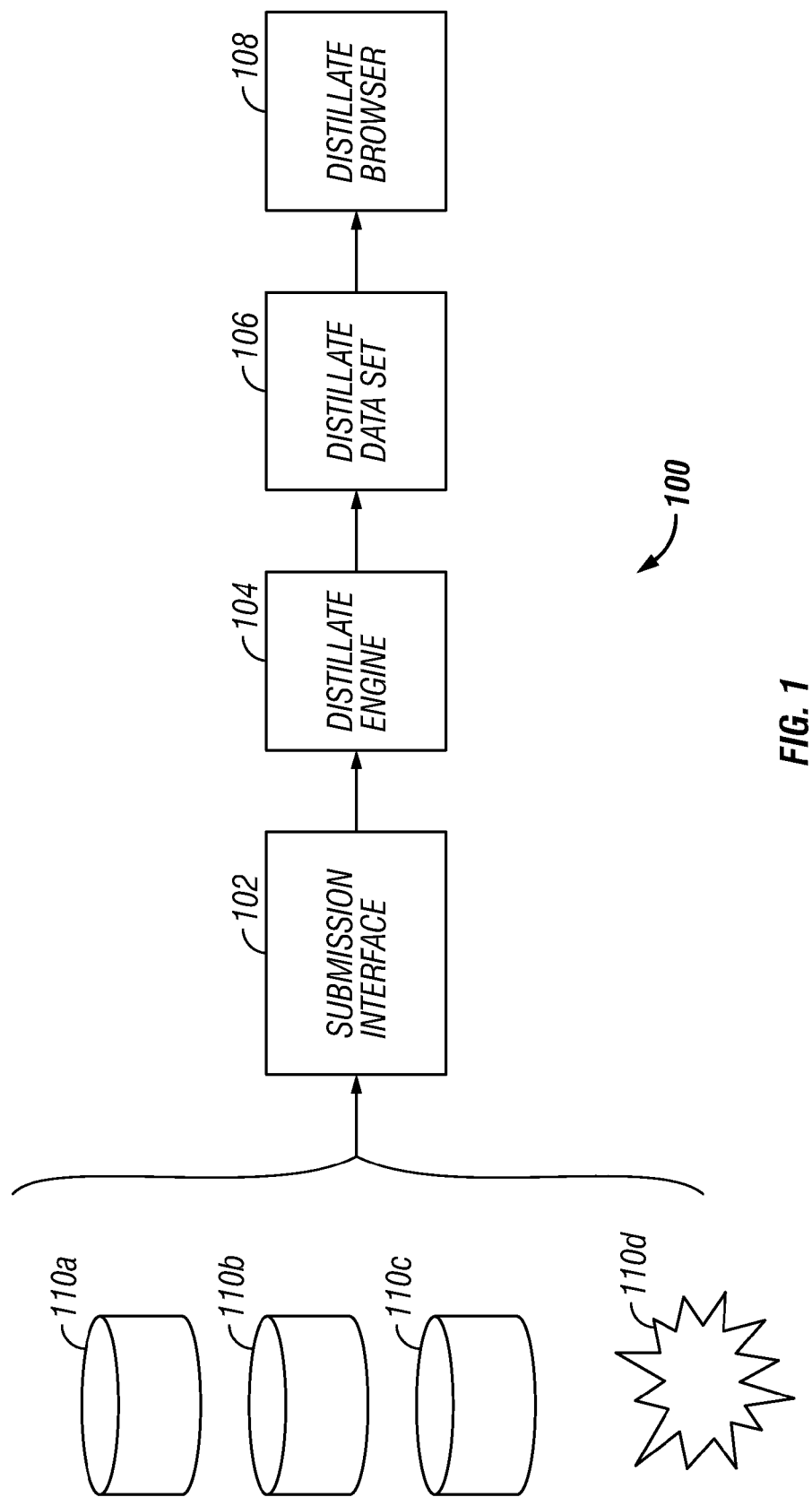

FIG. 2

| | | | |
|---|---|---|---|
| p1312.771 | | 7 | The Chinese associated health with plumpness (Buddha is always depicted as rotund |
| p1317.117 | | 4 | Buddhism Siddhartha Guatama, the Buddha, modified the Hindu tradition he inherite |
| p1317.157 | | 11 | Though even in Hinduism atman and self are not synonymous, the Buddha repudiate |
| p1317.293 | 44, 59 | | As Edward Conze paraphrases Nanda the Fair, attributed to Ashvaghosha: The sojou |
| p1317.363 | | 1 | Each Buddha takes an active role in saving his devotees. |
| p1319.295 | | 3 | by the historical Buddha, who, in turn, developed a more systematic and elaborate |
| p1319.338 | | 8 | The master of the Western Paradise is Buddha Amitabha and the residents of the lar |
| p1319.359 | 9, 15 | | At the opposite location is the Eastern Paradise of Buddha Bhaisajya-guru or the Hea |
| p1319.398 | | 15 | Beautiful and comfortable, all Buddhist heavens are occupied by holy beings such as |
| p1319.429 | 18, 22 | | In early Buddhist iconography, heaven is depicted as a part of the narrative represe |
| p1319.859 | | 22 | The most popular visual pattern of Buddhist paradise in East Asia consists of four ba |
| p1320.402 | | 8 | The Land of Bliss: The Paradise of the Buddha of Measureless Light. |
| p1398.1058 | | 2 | 1132), Standing Buddha (first century), The Maitreya of the Koryuji Temple (seventl |
| p1399.358 | | 1 | Standing Buddha radiates serenity, calm, and stillness. |
| p1399.376 | | 6 | Such an image of the Buddha was influenced by the Greco-Roman models of both sc |
| p1399.396 | | 5 | Like the Christ figure, this Buddha is also missing a hand the former his left hand, th |
| p1399.458 | | 25 | Whereas the Christ communicated ethereality and the perceived ability to float away |
| p1399.512 | | 8 | This is an image of the eternal, divine Buddha, not the moral teacher of the earliest |
| p1399.543 | | 8 | Despite the refinement, spirituality, and disciplined strength, this Buddha image con |
| p1399.74 | | 1 | Standing Buddha (1st century C.E.), Takht-iBahi, northwest Pakistan. |
| p1418.306 | | 4 | Welcoming Descent of Amida Buddha, eighteenth century. |
| p1445.223 | 12, 21 | | Theravada Buddhists, for example, may say that the image of the Buddha is simply |
| p1445.262 | | 12 | Yet, they bow with reverence and make offerings to statues of the Buddha even if th |
| p1454.580 | | 36 | It makes more sense to rely on the basic principles of the world's major religions reg |

804 — 803 — 802

```
Database: mnemo

Tables:

collection
    Field           Type            Null    Default
    -----------     -----------     ------  -----------
    location        text            No
    userid          char(32)        No
    doc_index       int(11)         No
    saved           tinyint(1)      No
    shared          tinyint(1)      No
    deleted         tinyint(1)      No doc
    Field           Type            Null    Default
    -----------     -----------     ------  -----------
    index           int(4)                  No
    location        text            No
    title           text            No
    author          varchar(64)             Yes     NULL
    numpages        smallint(6)             Yes     NULL
    uniquewords     int(11)                 Yes     NULL
    numwords        int(11)         Yes     NULL
    numstopwords    int(11)                 Yes     NULL
    numphrases      int(11)         Yes     NULL movedword
    Field           Type            Null    Default
    -----------     -----------     ------  -----------
    doc_index       int(11)         No
    word            varchar(16)             No
    parent          varchar(16)             No phrase
    Field           Type            Null    Default
    -----------     -----------     ------  -----------
    doc_index       smallint(6)             No
    rank            smallint(6)             No
    phrase          tinytext        No
    count           tinyint(4)      No
    cumulative_
        percent     float                   No
    phraseids       text            No word
    Field           Type            Null    Default
    -----------     -----------     ------  -----------
    doc_index       int(11)                 No
    rank            int(12)                 No
    word            varchar(16)     No
    count           int(11)         Yes     NULL
    cumulative_
        percent     float                   No
    wordids         text            No
```

METHOD AND APPARATUS FOR REAL TIME TEXT ANALYSIS AND TEXT NAVIGATION

CROSS-REFERENCE TO RELATED APPLICATIONS

This application is a continuation of the International Application No. PCT/US10/26853, filed in the U.S. receiving office on Mar. 10, 2010, which claims priority of U.S. Provisional Application Ser. No. 61/158,960 filed Mar. 10, 2009 and claims priority of U.S. Provisional Application Ser. No. 61/183,690 filed Jun. 3, 2009, each application incorporated in its entirety by this reference thereto.

BACKGROUND OF THE INVENTION

1. Technical Field

The invention relates to real time text analysis and access thereto. More particularly, the invention relates to a method and apparatus for real time extraction of text from a collection of sources and performing analysis on the extracted text for a more intuitive access by an end user.

2. Description of the Prior Art

For ages, people have been interested in learning about and discovering information. In the 1950's, a popular trend was for parents of young children to buy a set of encyclopedias for their children to have at hand to research topics, such as history and science, for school projects and the like. In the digital age, the quest for information has only become more relevant. Larger and larger quantities of digital content have become more available to an ever increasing global audience, as the economics of the supportive technology drives down the cost. Using search engines to retrieve and discover digital content information on the Internet or within enterprises is well-known. For example, suppose a researcher needs information about President Theodore Roosevelt. Typically, the researcher enters a query for a search engine from the researcher's browser. The query is typically one or more keywords, such as, "president theodore roosevelt". The search engine processes the query or list of keywords in accordance with its particular algorithm and presents to the researcher a list of web pages that contain one or more of the researcher's keywords. Depending on the particular search engine, other related data or metadata, such as the title of a pdf file that is available for download as indicated by the title being a hyperlink as well as some sample text from the pdf file, is presented on the researcher's browser. Should the researcher desire to learn more from this particular pdf file, the researcher clicks on the link which causes the pdf file to be downloaded onto the researcher's computer. From that point on, the researcher is left with an entire pdf document in which to search, retrieve, and discover pertinent information. If the pdf document is particularly large, perusing through the document to identify desired information or even just to discover what information therein may be relevant can be a laborious, time-consuming, and daunting task.

SUMMARY OF THE INVENTION

An end user, by way of a submission interface, instructs an engine to select particular collections of documents to process. The engine processes all the text from within all the documents from within the selected collections. The result of the processing of such text is a distilled data set. Such distillate data set is accessed through APIs by a browser. Different views of the accessed distillate data set may be presented to the end user via the browser. One or more of such views may be used to create a new document from sentences, paragraphs, chapters or documents from the distillate data set that correspond to the one or more views for presentation to the end user.

BRIEF DESCRIPTION OF THE DRAWINGS

FIG. 1 is a schematic diagram depicting main components of a text analysis and text navigation system according to an embodiment;

FIG. 2 is a table showing a column of sentences, a column of word position(s) within the sentence, and a column of the page id's on which the particular sentence is found according to an embodiment;

FIG. 3 is a table depicting a data structure according to an embodiment;

FIG. 5 is an example screen shot showing an example of the return result from an API call according to an embodiment;

FIGS. 12-20 are example screen shots using collections and sets according to an embodiment;

DETAILED DESCRIPTION OF THE INVENTION

Figure 4:
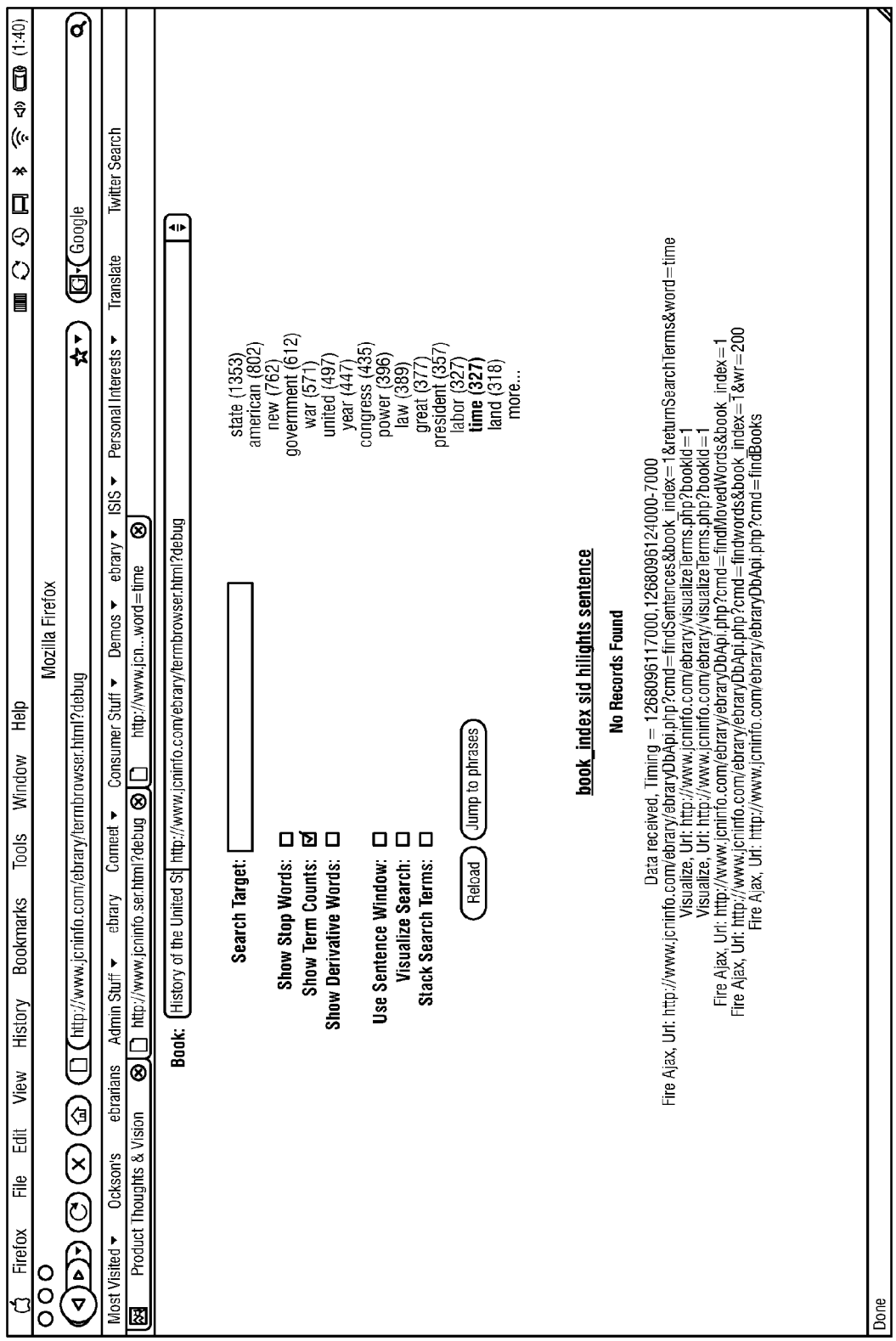
FIG. 4 is an example screen shot showing example APIs according to an embodiment.

Techniques for submitting, distilling, analyzing and viewing the distilled and analyzed text are discussed herein. It should be appreciated that various details and examples are set forth herein only for the purpose of providing a thorough understanding of the claimed subject matter.

Overview

An end user, by way of a submission interface, instructs an engine to select particular collections of documents to process. The engine processes all the text from within all the documents from within the selected collections. The result of the processing of such text is a distilled data set. Such distillate data set is accessed through APIs by a browser. Different views of the accessed distillate data set may be presented to the end user via the browser. One or more of such views may be used to create a new document from sentences, paragraphs, chapters or documents from the distillate data set that correspond to the one or more views for presentation to the end user.

Functional Overview

In an embodiment, a system for extracting the textual information contained within structured and unstructured electronic source documents creates a normalized text representation of the extracted text. The system then performs a series of successive analysis against the normalized text representation, including punctuation analysis, font analysis, word frequency analysis, statistical analysis, and phrase detection. The system then creates a machine readable index of the locations of all of the words, phrases, sentences, paragraphs and page information from the analyzed, normalized text that is correlated to the unanalyzed normalized text. If metadata is present for the document then that information is also stored. It should be appreciated that metadata need not be present.

In an embodiment, information, such as the analyzed, normalized text described above, within the database is accessed through application programming interfaces (APIs). Information is requested from the database and is presented to the user in an interactive matrix of the words, phrases and statistical information of the words and phrases. Such presentation enables the user to examine the words and phrases, and their relationships with each other, within a single document or across multiple source documents. The user is presented with an interface that is interactive and includes the ability for the user to control the presentation of the word and phrase order according to frequency of occurrence, order of occurrence or through alphabetical listing.

In an embodiment, the user may also enter queries into a text entry box that will query the database for occurrences of the exact string or the string and the other words that in conjunction with the query constitute a phrase. Through the selection of a word or phrase, or a selection of multiple words or phrases, which are selected by clicking on the desired word or phrase, the user is then presented with the requested words or phrases, and the words that may precede the selected word or phrase or be antecedent to the selected word or phrase. With the information presented in this manner the user may navigate across collections, subjects, documents, chapters, articles, pages and sentences finding the information that they require without ever opening a document.

In an embodiment, the context of the word or phrase is displayed as sentences that contain the word or phrase, pages containing the word or phrase. Such word or phrases may be displayed or presented to the user in a variety of modes. Such modes may include normalized text or text from the original document in its original context, through a text to speech engine that reads the text across computer networks, through a display of the occurrence, by density, within a chapter, and density of occurrence within a document, subject or collection. In this way the system allows the user to navigate with equal facility up or down through hierarchies of large information sets of ever greater or smaller granularity.

Structural Overview

An example system according to an embodiment can be described with reference to FIG. 1. FIG. 1 depicts the main components of a text analysis and text navigation system 100 according to an embodiment, each of which is described in further detail hereinbelow in sections by the same name as the component.

A user can enter one or more documents into the system via a submission interface 102. Submission interface 102 is in communication with one or more document repositories 110a-110c. Submission interface 102 may be hosted on at a user's server, or a customer's server, or hosted by a content information provider server, and the like. Examples of repositories 110a-110c are collections of documents, one or more databases in which documents are stored, and so forth. Such repositories may be hosted on the user's client machine, on a customer's server, hosted by a content information provider, and so forth. A repository may be a particular web site(s) on the Internet 110d. For example, particular web site(s) 110d may be Google, Mountain View, 2010. It should be appreciated that the term, collections, may be used interchangeably with repositories herein. Repositories and particular web site(s) 110d can be viewed as collections of text documents.

In an embodiment, submission interface 102 takes text documents or portions thereof as input from any of repositories 110a-110c and particular web site(s) 110d. Put another way, submission interface 102 takes text documents or portions thereof as input from any collection(s) and submits such collections to a distillate engine 104 for further processing. It is contemplated that submission interface 102 may operate on the text of the collection to render the text in a format that is compatible with distillate engine 104. For example, submission interface 102 may receive a pdf document and convert the pdf document into another format that is compatible with distillate engine 104.

In an embodiment, distillate engine 104 extracts text from the documents and performs various operations on the extracted text to create a normalized text representation of the extracted text. Distillate engine 104 then performs a series of successive analysis against the normalized text representation, including, but not limited to any of punctuation analysis, font analysis, word frequency analysis, statistical analysis, and phrase extraction. After performing such analysis on the normalized text, distillate engine 104 creates a machine readable index of the locations of all of the words, phrases, sentences, paragraphs and page information from the analyzed, normalized text that is correlated to the unanalyzed normalized text. An index may be a file or a table or any other schema that contains the information described hereinabove. Such schema and normalized data are stored in a distillate data set 106 for future access by a future process. As well, if metadata is present for any of the documents then that information is also stored within the index or schema with distillate data set 106. It should be appreciated that metadata need not be present.

A distillate browser 108 allows a user various views on text data from documents from collections according to an embodiment. Using browser 108, a user can search text, e.g. words or phrases, among selected documents. Further, a user can browse text in selected documents, can annotate, copy, or print text from selected documents, and can store such actions on such text from such selected documents in a tool that may be referred to as a Bookshelf. The data corresponding to the Bookshelf may be stored locally at the user's server or remotely. The user can send the Bookshelf related data to another user(s), whereby the other user(s) has access to the particular selection of documents by the user as well as any annotations made on any of the documents by the user. In this way, researchers can share their research at any stage of their particular research, without having to physically copy their own physical copies of notes and highlighted documents.

Submission Interface

In an embodiment, submission interface 102 feeds documents or parts thereof into distillate engine 104. In addition to the discussion hereinabove, some of the responsibilities of submission interface 102 may include keeping track of which documents have already been submitted to distillate engine 104. As well, submission interface 102 may look for new documents that aren't already submitted to distillate engine 104. In an embodiment, submission interface 102 may automatically start looking new documents in any repositories 110a-110d and stop after a specified number of times, e.g. 500, or stop after a default number of times.

Distillate Engine

Normalize Text

In another embodiment, distillate engine 104 normalizes text. Any text file or any file that's capable of providing text is normalized. An interim result of normalizing text is a subset of text that is used for normalized data representation. Such subset of normalized text is processed. Separate streams of data are created. For example, a list of the beginnings of all the sentences is created and stored in distillate data set 106. As well, a list of all the beginnings of all the paragraphs may be created and stored in distillate data set 106. As well, a list of all the beginnings of all the chapters is stored in distillate data set 106. A list of all the text that was identified by distillate engine 104 to be found in parentheses is created and stored in distillate data set 106. A list text that was included in parentheses can be used at least for two things: determining the meanings of acronyms and because acronyms are capitalized letters existing before or after corresponding text. As well, particular data structures can be determined from text that is found in parentheses. For example, life expectancy, date of birth, date of death, and so forth can be determined from the fact that the corresponding text thereof is found in parentheses.

Thus, by going through and parsing normalized text, determining everything that's parentheses may lead to identifying significant data structures.

It should be appreciated that, in an embodiment, normalized text can be viewed as a data representation whereby all the data is at the same level, with respect to attributes. Then, particular processes are applied to the set of normalized data. From the processed, normalized data, and distillate engine 104 builds and stores, e.g. in distillate data set 106 or in virtual memory of distillate engine 104, an index for the document(s). It should be appreciated that using such index allows distillate browser 108 to completely recreate the normalized text to represent the original text. Thus, distillate engine 104 identifies the words and phrases that are unique and identifies the corresponding sentences. Then, when distillate browser 108 needs to build the sentences, e.g. to present the sentence in a view, distillate browser 108, via an API, simply sends a message to distillate data set 106 asking for a particular word or phrase. Such word or phrase contains information indicating the location of the stored sentence in distillate data set 106. That is, every word in the sentence is given a page identity and a word number

Punctuation Analysis

In another embodiment, punctuation analysis is performed by distillate engine 104. Punctuation analysis may include identifying words in parentheses, words in quotes, and words that are capitalized. Words that are capitalized after a period are common. After identifying such words, rules are applied to normalize the words.

Word Stemming

In another embodiment distillate engine 104 performs word stemming. Word stemming is a process by which instances of words variations are identified as being the same word with respect to searching for such word. For example, the words issue and issues are both identified as "issue" or "issues". Thus, if both words appear once in a document, and a user searches for the word, "issue", then the resultant set is two counts of the word, issue.

Phrase Extraction

Another embodiment of text processing by distillate engine 104 is discussed herein below. Distillate engine 104 takes all the words, keeps all the positions of all the words within the document, performs a phrase analysis to determine statistically significant phrases. One way by which distillate engine 104 does this is by taking the most used word in a document, going through every sentence that contains that word, truncating the sentence before the word, and then analyzing the words after the word to build a word data tree, for example. For example, each word may be a node, whose children are other words that followed the word in the truncated sentence. Distillate engine 104 processes the entire document by performing the process above iteratively, by going through every word within the document. It should be appreciated that operating on a document in this fashion to identify significant words and phrases is by way of example only and is not limiting. One skilled in the art can apply a variety of analytical algorithms to determine and identify significant word(s) and phrases within a given document.

An example of a way to store sentence information can be found in FIG. 2. FIG. 2 is a table showing a column of sentences 802, a column of word position(s) within the sentence 803, and a column of the page id's on which the particular sentence is found 804. Thus, for example, the first row shows that the word, Buddha, which was searched, is found at page id p1312.771 and is the $7^{th}$ word in the sentence and shows a portion of the sentence. The fourth row shows that Buddha is found at page id p1317.293 and is the $44^{th}$ and $59^{th}$ word of the sentence and shows the sentence.

In an embodiment, phrases are computed or identified out to a specified numbers of words. Conceptually, phrases can be computed to an infinite number of words. In an embodiment, sub-phrases within a larger phrase may be identified through essentially orphans in the data tree, even when there's only an occurrence of such sub-phrase once as being significant. That is, a phrase having count one may be useful.

Stack Search Terms

In an embodiment, a user can stack search terms, which is defined to mean that a user can indicate one or more search terms in a single search request. For example, a user can enter the search term, European War, and the search term, "end of the war". The result set shows where such stacked search terms appear together according to a particular resolution. For example, the result set may show one or more paragraphs in which these stacked search terms appear together. In another example, the result set may show one or more pages in which these stacked search terms appear together, and so forth.

An Embodiment of a Process Flow

A process flow for processing extracted text from a document according to an embodiment is described hereinbelow. It should be appreciated that such process is by way of example only and one skilled in the art can contemplate variations and still remain within the spirit and scope of the process flow.

Stop Words

In an embodiment, distillate engine 104 takes an accounting of words from a document. There is a list of stop words. Stop words contain words such as, "if, and, but," which are very common. Stop words have been found to make up about eighty percent of the given number of words in a given document. Thus, in an embodiment, stop words are discarded from the set of words from a particular document.

Accounting of Occurrence and Location of Words

In an embodiment, after discarding the stop words, distillate engine 104 makes an accounting of the occurrence of every remaining word and its location, by saving the information as a page-word number pair. Thus, a list of the discrete words within the document is created.

Stemming and Word Subordination Determination

In an embodiment, after creating the list of discrete words, the words within the list are alphabetized. After the words are alphabetized, a sorting algorithm is applied to the words. Such sorting algorithm performs stemming, which is a process used to identify words that have the same stem or root or unit. Any stemming algorithm may be applied. In an example, a particular stemming algorithm may look for particular endings of words, such as "ly" or "ing" and so forth. Such particular endings may be provided in a table, for example.

In an embodiment, a word subordination algorithm is applied to the set of words. Word subordination is a process to identify words that may be consumed by other words, which may be referred to as parent words. After identifying which words are subordinate to other words, such subordinate words are discarded from the set of words to be further processed by distillate engine 104 and the occurrences of each subordinate word is added to the occurrences of the parent word. A record reflecting the removal of the subordinate word is added to a different table. An example of such table is found in FIG. 3 herein and is labeled "movedwords."

For example, consider the word, "cat", which has 100 occurrences and "cats" which has three occurrences. Then "cats" will be subsumed into the parent, "cat". Specifically, the occurrence of "cat" is now equal 103. As well, "cats" is removed from the current set of words and is added to "movedwords" table.

In an embodiment, an algorithm is applied which determines whether a discrepancy between the number of occurrences of a pair of words is large enough, or greater than a threshold value, to consider a word of the pair as subordinate to the other word. For example, consider the word, "American" and suppose "American" occurs 100 times. Also consider the word, "America" and suppose "America" occurs 80 times. According to an embodiment, the discrepancy algorithm may determine that "America" is not subordinate to "American" because "America" occurred within a particular percentage of the occurrence of "American". An implication is that both words may have meaning and importance to an end user.

Thus, after normalizing all words and computing all occurrences of words, distillate engine 104 instructs distillate data set to save such information, such as in tables or other data structures.

Identifying Sentences

In an embodiment, distillate engine 104 identifies a sentence within a document by identifying a capital letter as a start position and continue including words as part of the sentence until the algorithm reaches a period, a question mark, an exclamation point, etc. It should be evident to one skilled in the art that many algorithms may be used for identifying sentences within a document and still be within scope of the claimed subject matter.

Index

In an embodiment, distillate engine 104 creates an index that is a mapping of a word id to a sentence id. Thus, when the word id is invoked from the index, e.g. an end user having selected the word in distillate browser 108, the sentence id is identified and the sentence associated with the sentence is can be presented to the user in distillate browser 108. In an embodiment, an index contains a list of every occurrence of a word, normalized, within a document and can be used to identify the sentence id, from which the sentence can be generated.

For an example refer to FIG. 2. The first row shows a sentence id=p1312.771. Then, a word id can be generated by adding the location of the word, "7", to the sentence id to result in, "p1312.778". One skilled in the art would recognize that such level of detail is by way of example only to convey a thorough understanding and is not meant to be limiting. Any algorithm for mapping word ids to sentence ids may be used.

Statistical Analysis

In an embodiment, statistical analysis is performed on aspects of a word. For example, statistical analysis may applied to the number of occurrences of a word to determine its statistical occurrence and relative ranking.

Thus, such statistical analysis may be used in designing a particular interface. For example, a particular interface can present words based on the statistical analysis of the words and their relative ranking.

Words/Phrases

It should be appreciated that discussions about words herein may be applied to phrases. For example, it is contemplated that an index can comprise a mapping of phrases to sentences. Detailed discussions herein about words are meant in the spirit of conveying a thorough understanding and not to obfuscate the discussion.

Phrase Extraction

In an embodiment, a phrase extraction algorithm is used by distillate engine 104 to extract significant phrases from a document. An example algorithm is as follows. Distillate engine 104, by way of an API, requests a list of words by frequency from distillate data set 106 or from any available list of words having the number of occurrences in the document. Thus, the most popular word is at the top of the list, the next popular word is next on the list and so on. In another embodiment, the request for words may be by an alphabetical sort, by density, as described herein, or by any other criteria that indicates relevancy of the document.

For every word, distillate engine 104, through an API, requests from distillate data set 106, a list of every sentence in which the word occurs.

An algorithm is applied by which a particular sentence is cut at the occurrence of the word. It should be appreciated that the sentence may have more than one occurrence of the word. Then, from these chopped portions of the sentence, for a particular portion, a data tree is created. Each node in the tree is the particular word. Each child node is every word that follows the particular word in the portion of the sentence. Each child node has children nodes that follow it in the portion of the sentence, and so on.

Thus, traversing down any path in the tree is a viable sentence stem that occurs in the particular document for a particular word.

After the tree is built, the tree can be traversed to identify the thickest branches, which represent sentence stems or phrases that occur more often than once.

It should be appreciated that certain statistical analysis may be applied, such as discarding paths that are determined to be too long, etc.

In an embodiment, a list is thus created which contains all of the phrases in a particular document which start with a particular word. This is then repeated for each word in the original list, resulting in a meta-list of all potentially interesting phrases in the document. It should be appreciated that then, redundancy algorithms and such can be applied to modify the list to represent more meaningful phrases. For example, subordinate phrases may be removed from the list because they already appear in the parent phrase.

Then, in an embodiment, after such tree is built, then a second tree is built for the next popular word in the document, and so on.

API

In an embodiment, the API is document agnostic, meaning, it is not confined to working on one type of document. For example, the API can request the word, "cat" from one document, from a portion of a document, from many documents, etc. An example of APIs can be found in FIG. 4. Here, the APIs are used by distillate browser 108 to request data from distillate data set 106. The APIs are accessed via Ajax. These particular APIs requested words from the book, History of the United States" by frequency rank. The word, time, is shown to have 327 occurrences. As another example, the API can request phrases by density from a set of online Scientific American journals from 2006-2009.

FIG. 5 shows an example of the return result from an API call according to an embodiment. The return result is a list from distillate data set 106 of words and phrases, and search terms that were generated from the book, History of the United States."

Distillate Data Set

In an embodiment, distillate data set 106 contains a table of all the words in a particular document. As well, a list of sentences that occur within a particular document is saved in distillate data set 106.

FIG. 3 shows an example schema structure according to an embodiment that includes table definitions for collection, documents, movedword, phrase, and word. Such table is build as a result of the processing of text from documents from collections by distillate engine 104. Such table is referenced by API calls by distillate browser 108 for accessing particular text from one or more particular documents from one or more collections and for presenting such accessed text according to particular design criteria for distillate browser 108.

As mentioned above, FIG. 2 depicts a table showing a column of sentences 802, a column of word position(s) within the sentence 803, and a column of the page id's on which the particular sentence is found 804. In an embodiment, such table of sentences is stored in distillate data set 106 and is used by API calls from distillate browser 108.

Distillate Browser

An Example User Experience Using a Single Document

In an embodiment, a user is presented with one list of words, sorted in descending order by frequency and a text entry window, the entry of which is called the primary entry ("primary"). It should be appreciated that the list of words can be sorted according to other criteria, including, but not limited to, word density, e.g, the occurrence of a word within the following 5 paragraphs following the first instance of the word. It should be appreciated that the embodiment encompasses the user and the system working with phrases, as well as with words. Clicking on the frequency list moves the selected word to the primary position. Upon entering the primary word, the user is shown preceding and anteceding words and lists of sentences containing the entered word. A single click on any word adds such word to primary. Thus, the user is shown new preceding and anteceding words and a new list of sentences containing the words or phrase. Double-click of word in any other column moves selected word to replace primary. Upon entering primary word, user is shown preceding and anteceding words and lists of sentences containing the word or phrase.

Figure 6:
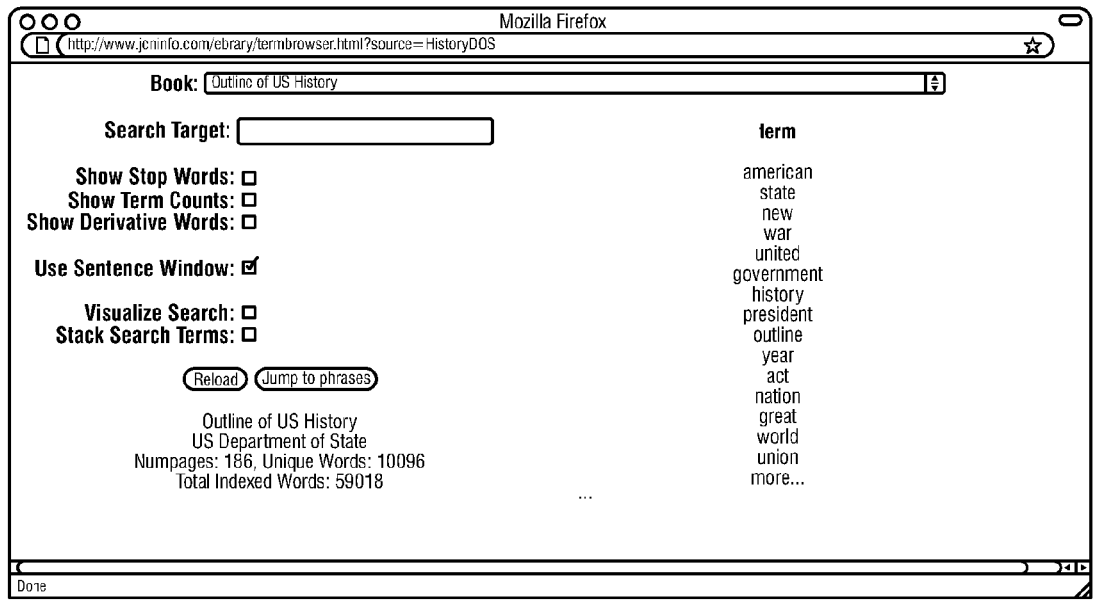
FIGS. 6-10 are example screen shots navigating and learning about words and phrases of a document according to an embodiment.

An example of a screen shot illustrating words listed based on frequency of occurrence, according to an embodiment, is depicted in FIG. 6.

Figure 7:
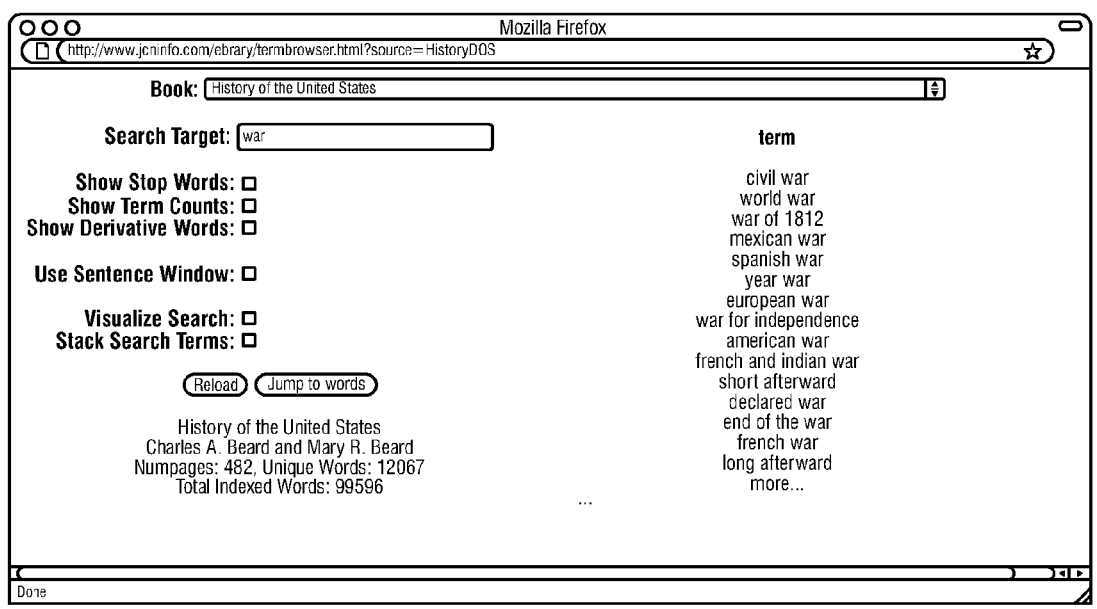

FIG. 7 is an example of screen shot in which the search term is war, showing results for all occurrences of "war" within the document "History of the United States," according to an embodiment.

Figure 8:
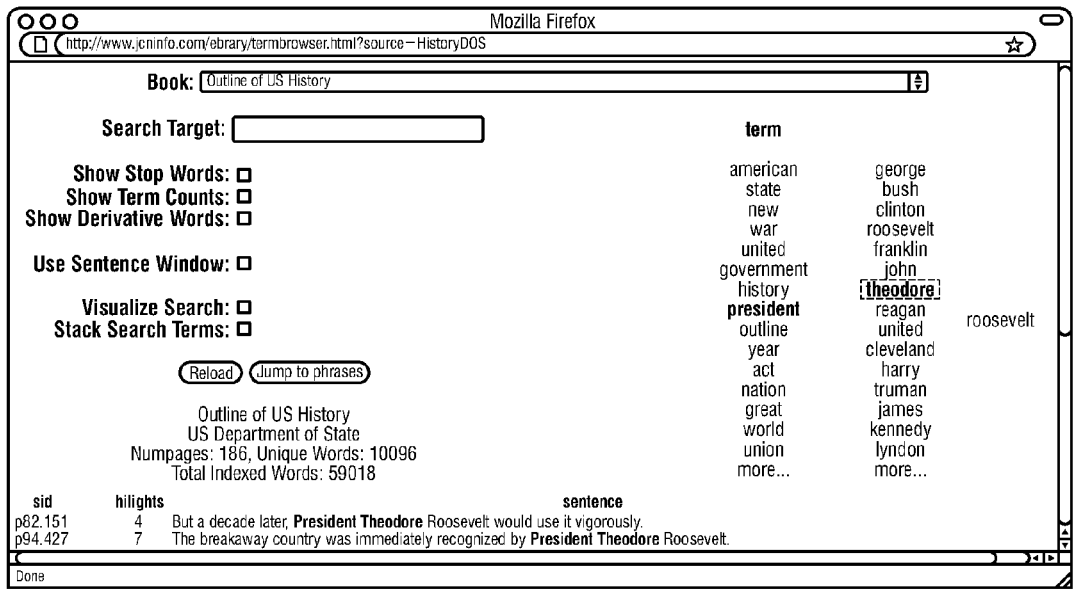

FIG. 8 is an example of a screen shot according to an embodiment, illustrating an end user selecting "President", then being presented with a list of options of antecedent words, and then selecting "Theodore," and finally being presented with "Roosevelt" to complete the phrase. FIG. 8 also shows some of the sentences from the document that contain the words President Theodore Roosevelt.

Figure 9:
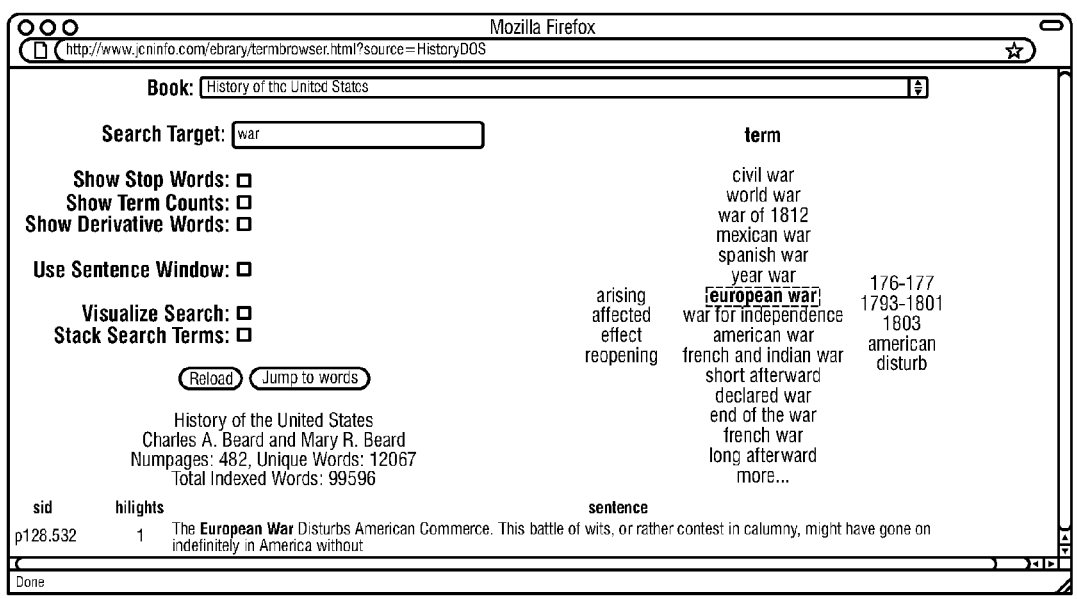

FIG. 9 shows an example screen shot according to an embodiment wherein a user had selected "european war" from the search results, showing the first sentence containing the phrase "European War".

Figure 10:
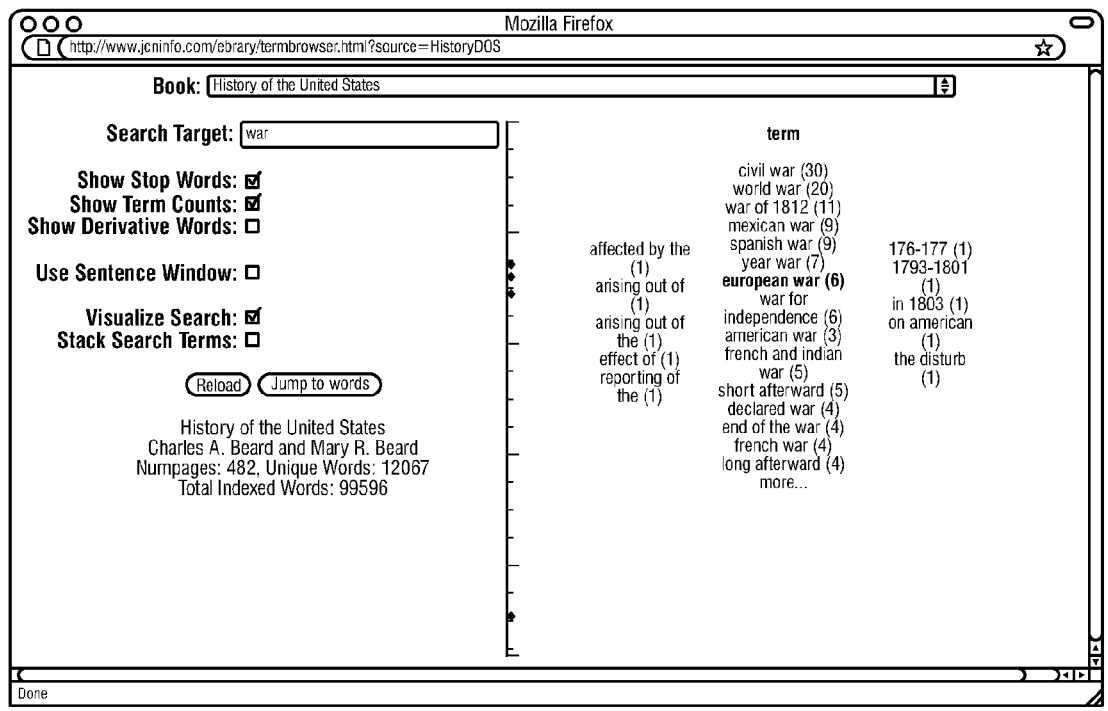

FIG. 10 is a screen shot according to an embodiment of an interface showing the selected term, "european war" with all of its preceding and anteceding words.

Show Stop Words

In an embodiment, the user has the option of the view showing the stop words or not showing the stop words. Stop words are defined as common words used that have no substantial impact on meaning. Examples of stop words are: it, the, an, and, so, etc. Thus, suppose, for example, a user is interesting in the phrase, President Wilson, with "show stop words" feature on. The resulting view contains all the words before and around President Wilson, up to a predetermined number of words. Thus, when the user selects President Wilson, the view shows a significant portion of what is discussed before and after President Wilson within the document or within a set of documents. When a user is not interested in the view containing the stop words and indicates as such, then the view shows the other phrases that occur around President Wilson. Thus, a user gains more insight into the context surrounding President Wilson. Such insight may significantly enhance the user's pedagogical experience by highlighting significant phrases that correlate in some way with the phrase, President Wilson.

Implementation

In an embodiment, distillate browser 108 is written in HTML and JavaScript and uses Ajax, which is a protocol which allows the updating of Internet pages dynamically. Ajax is used to access the API and request data.

In an embodiment, once a phrase or word is selected, sentences are included in the data returned to distillate browser 108. A data tree is generated by distillate browser 108. Thus, if a user selects the word "cat", sentences in which "cat" occurred are returned to and displayed in distillate browser 108. As well, the words preceding and anteceding "cat" are also presented. Such words are obtained from the generated data tree. For example, the anteceding words are presented in a column to the right of "cat" and the preceding words are presented in a column to the left of "cat". (See FIG. 5, for example)

In an embodiment, when a user selects a word in the preceding or anteceding list, then all the words preceding and anteceding the selected word are presented, for example, in columnar fashion as before. In addition, the sentences which contain that selected word are also obtained and presented on the display.

In an embodiment, the generated data tree is dynamically updated based on user selections and deselections, etc., within distillate browser 108, accessing distillate data set 106 through the API via Ajax and updating its internal dynamic data structures to represent the data which is being viewed at distillate browser 108.

Asynchronous

In an embodiment, processes work in an asynchronous fashion. For example, after a user selects a particular phrase or a particular set of documents (no query has been requested, yet), distillate browser 108 displays the return data as it comes in. That is, if the order of phrases is by frequency, then the most frequently occurring phrase is listed at the top. If, while still obtaining the phrases, a more frequent phrase is found, then distillate browser 108 is dynamically updated and shows the more frequent phrase at the top of the list. The distillate browser 108 is dynamically updated continuously until the process is done. This allows the user to get instant feedback while the process allows the data to mature. As well, a user can decide, based on the dynamic results the user is currently viewing, to stop the particular search and start a new one.

Multiple Documents

In an embodiment, a user can explore words and phrases from multiple documents that may be from one or more collections of documents from a same or remote server(s).

Collection and Set Management

Figure 11:
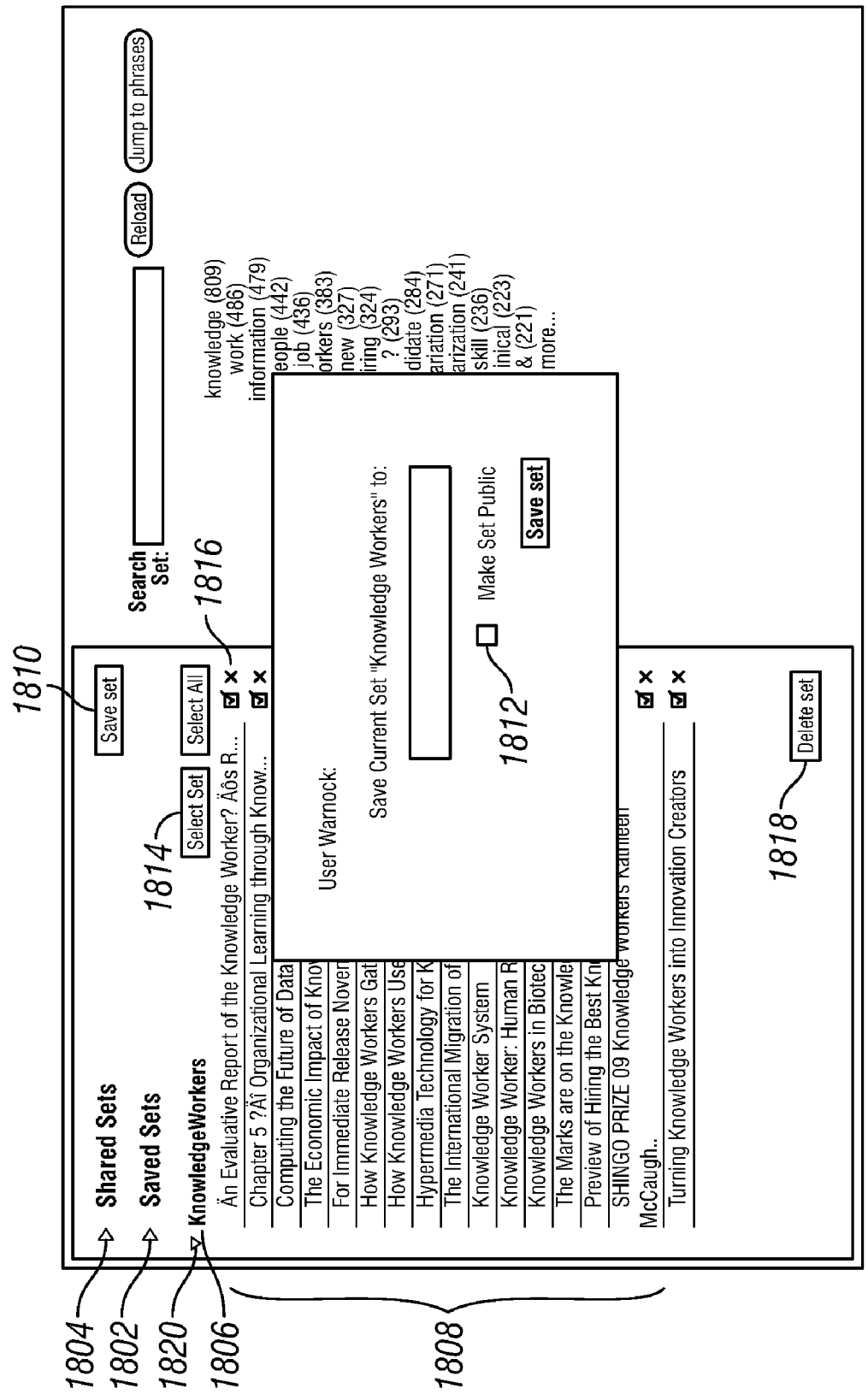
FIG. 11 is an example screen shot showing during a user request to save sets to the user's collection according to an embodiment.

A collection and a set according to an embodiment are described hereinbelow and by reference to FIG. 1 and FIG. 11. In an embodiment, a collection may be transitory or temporary or saved, for example, by association with an end-user's login. Users can save sets to their collection. In an embodiment, a user is presented at the interface, e.g. browser 108, with two folders, e.g. at the top of the left column, called "saved sets" 1802 and "shared sets" 1804 and their latest query 1806 with the titles listed below 1808. Saved sets include the sets that that user has purposefully saved. When saved the user may save that set into an existing saved set, or the user may create a new set with a name of their choosing. Users may perform a similar function by searching with the same query. When they save a set, e.g. by the user action of clicking a button 1810, they may choose to "share" that set, e.g. make set public 1812, in which that information becomes publicly accessible to all users of the text analysis and text navigation system 100, or this set of information may be added to an existing set within the shared sets, if the user created the shared set. This is done by saving the set with the same name as a shared or saved set. Below the saved sets and shared sets folder, the user's query is displayed followed by the lists of titles submitted by that query. This means that the user is presented with a view that displays the query they performed and the titles for that query, e.g. beneath the saved sets and shared sets folder. When the user selects a word or phrase, the document titles, e.g. on the left hand side of browser, indicate the hits within the documents. There is an indicator 1814, e.g. a button at the top of the title list, which allows the user to select the set of documents that contain the selected word or phrase, herein called select set. Selecting the set un-checks all of the other documents from the active set so that only the documents containing that word or phrase remain selected. A user may delete titles from the set, e.g. by clicking on the red "x" 1816, and saving the set 1810. A user may delete a set, e.g. by clicking the delete set button 1818. This action deletes any current sets of information. For example, a set is current if the twiddle 1820 is open and the titles are exposed. If multiple twiddles are open, for example, then the user is combining sets of information to a single set.

Caching Mechanism

In an embodiment, collections of documents that are selected are stored in a cache. Thus, for example, when a user deselects a document from the collection, the remaining set is established within the cache. Such cache may exist for an indefinite amount of time or for during a user session, for example.

An Example Usage Flow

Figure 12:
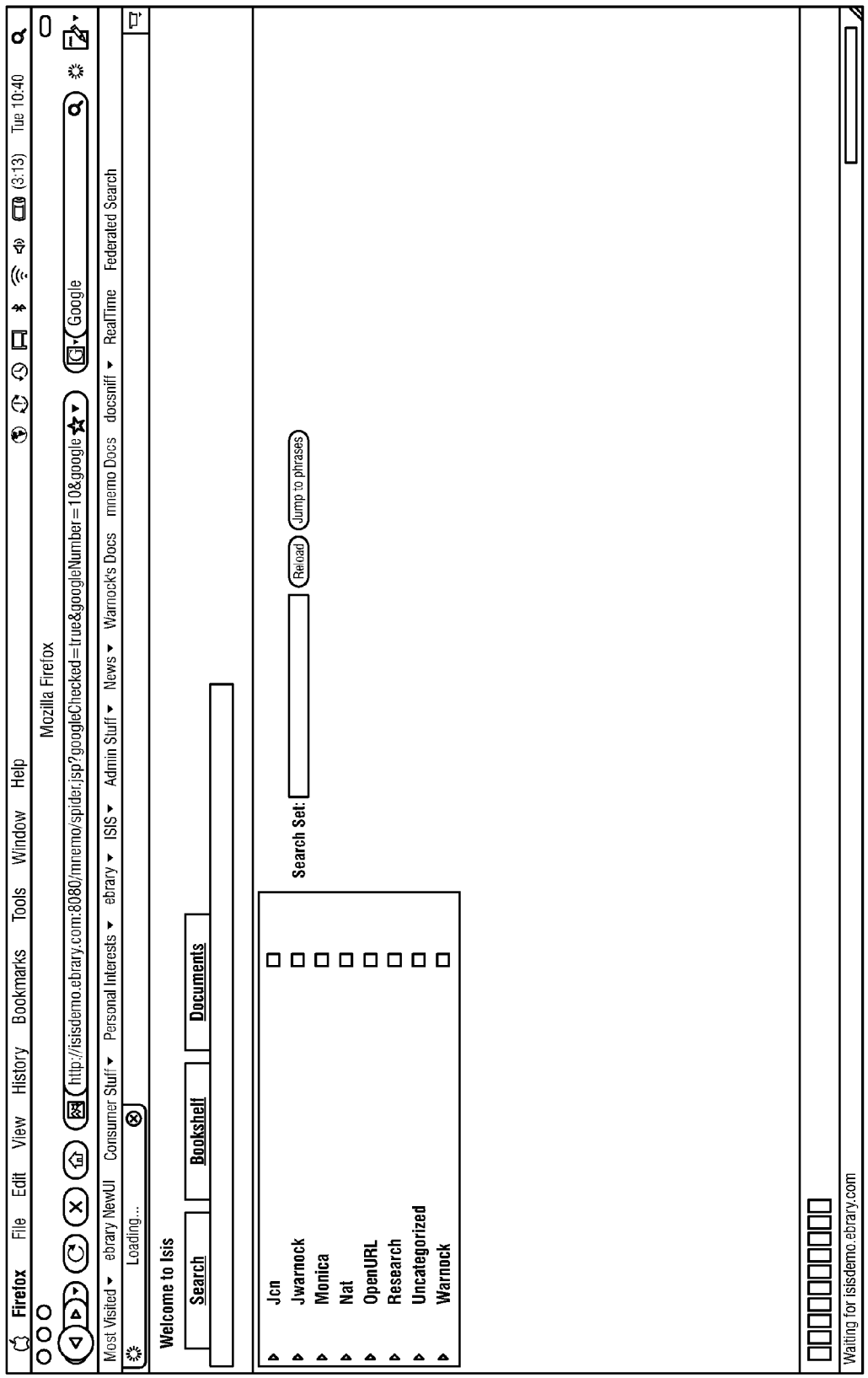
Figure 13:
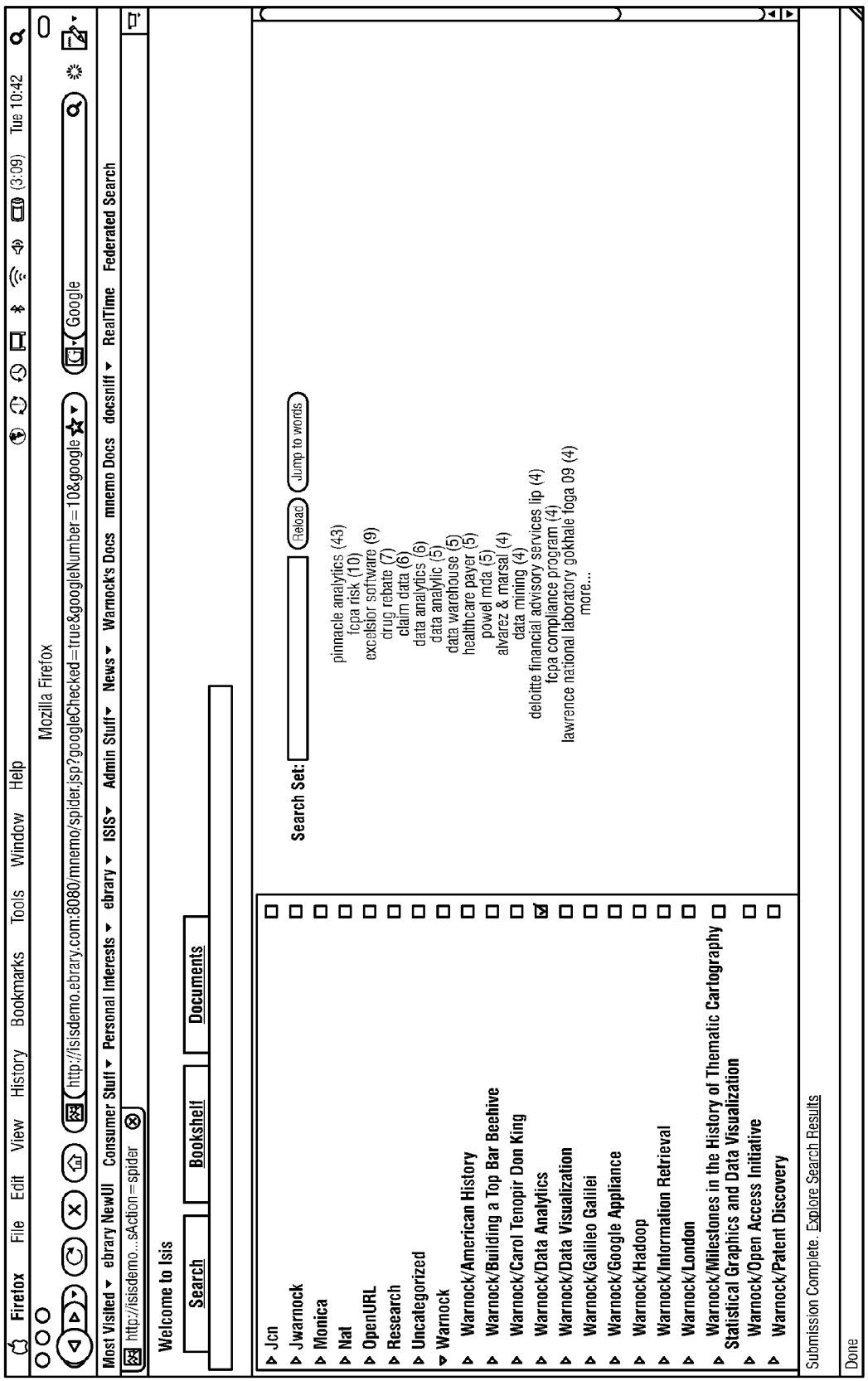
Figure 14:
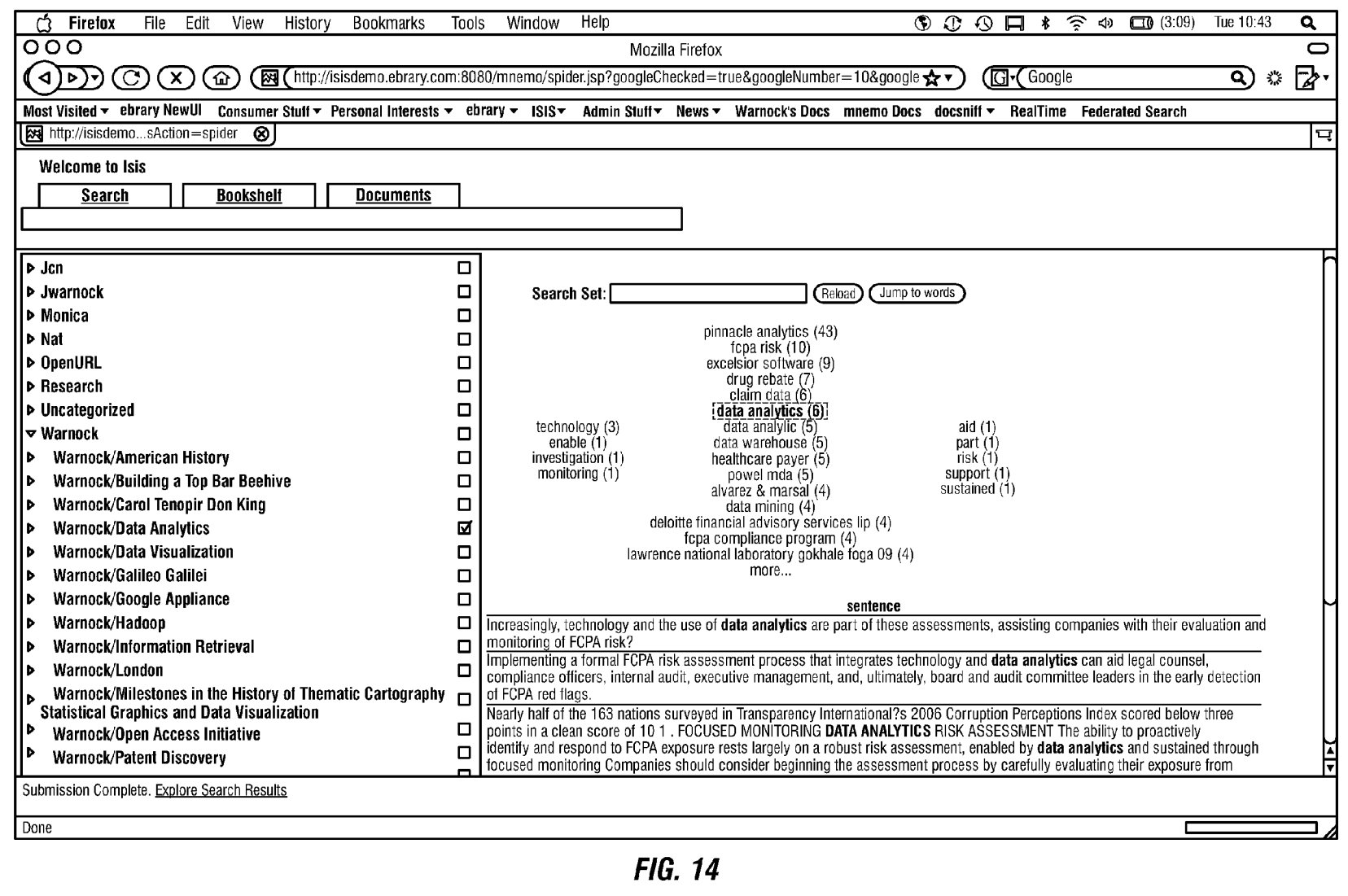
Figure 15:
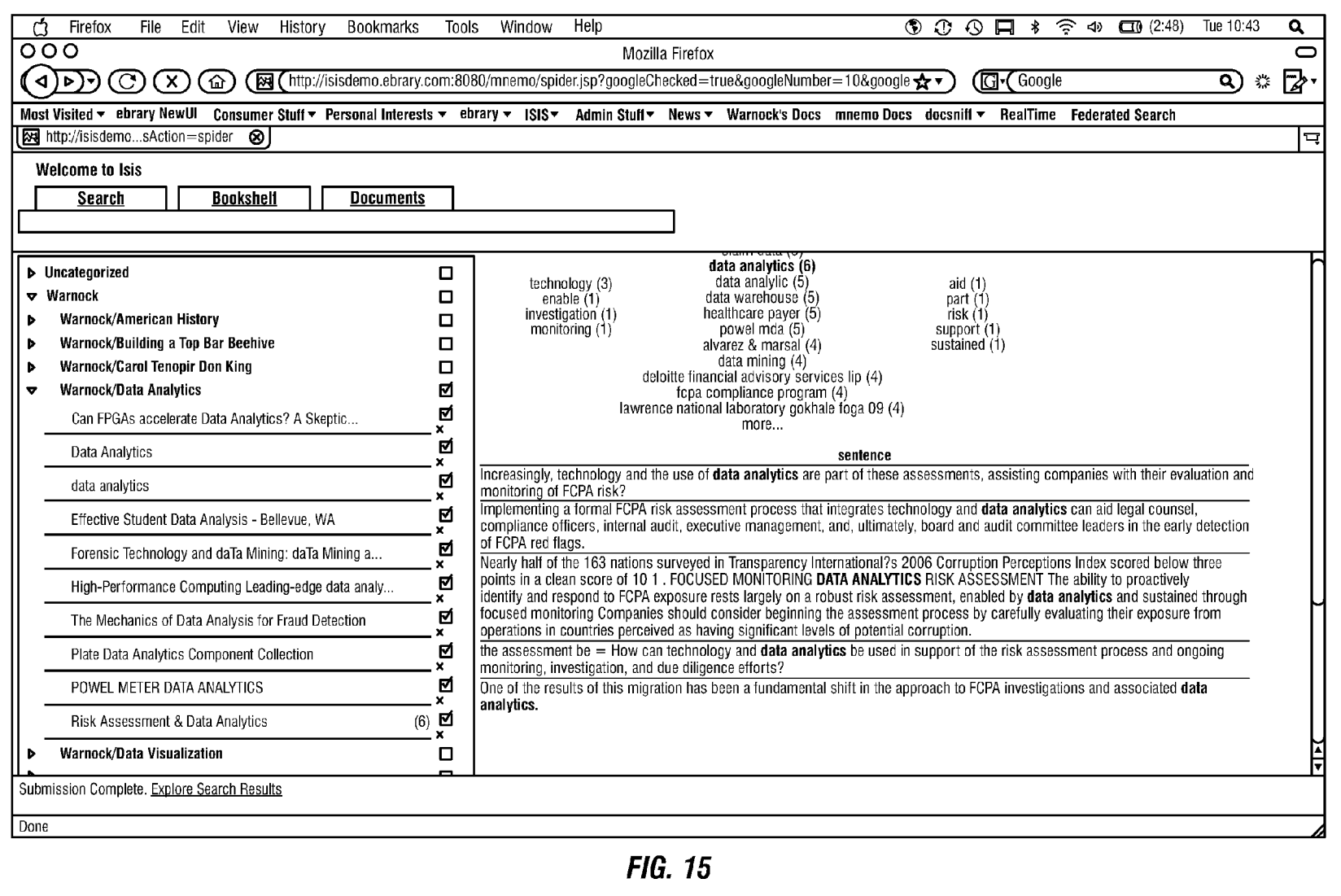
Figure 16:
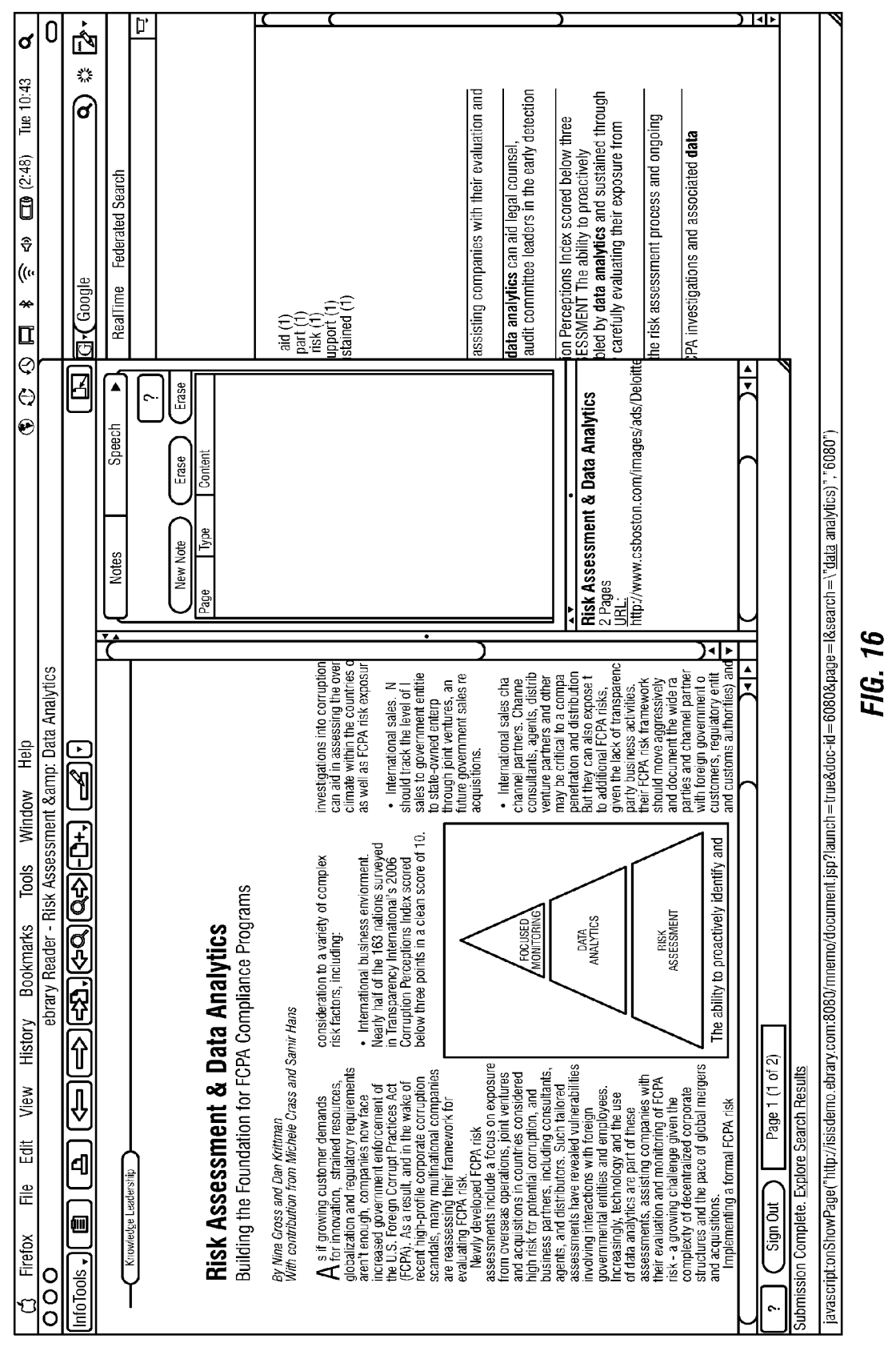
Figure 17:
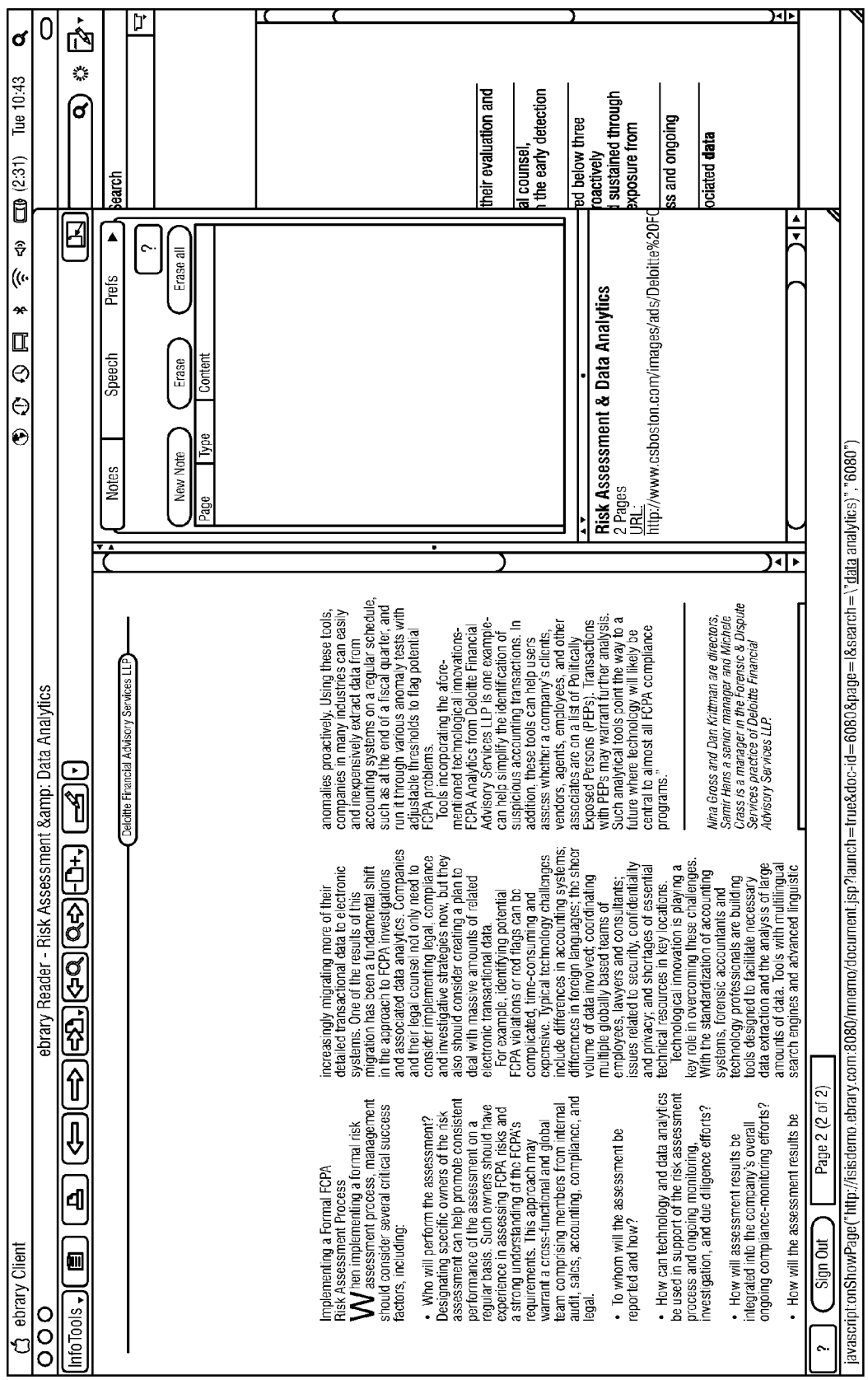
Figure 18:
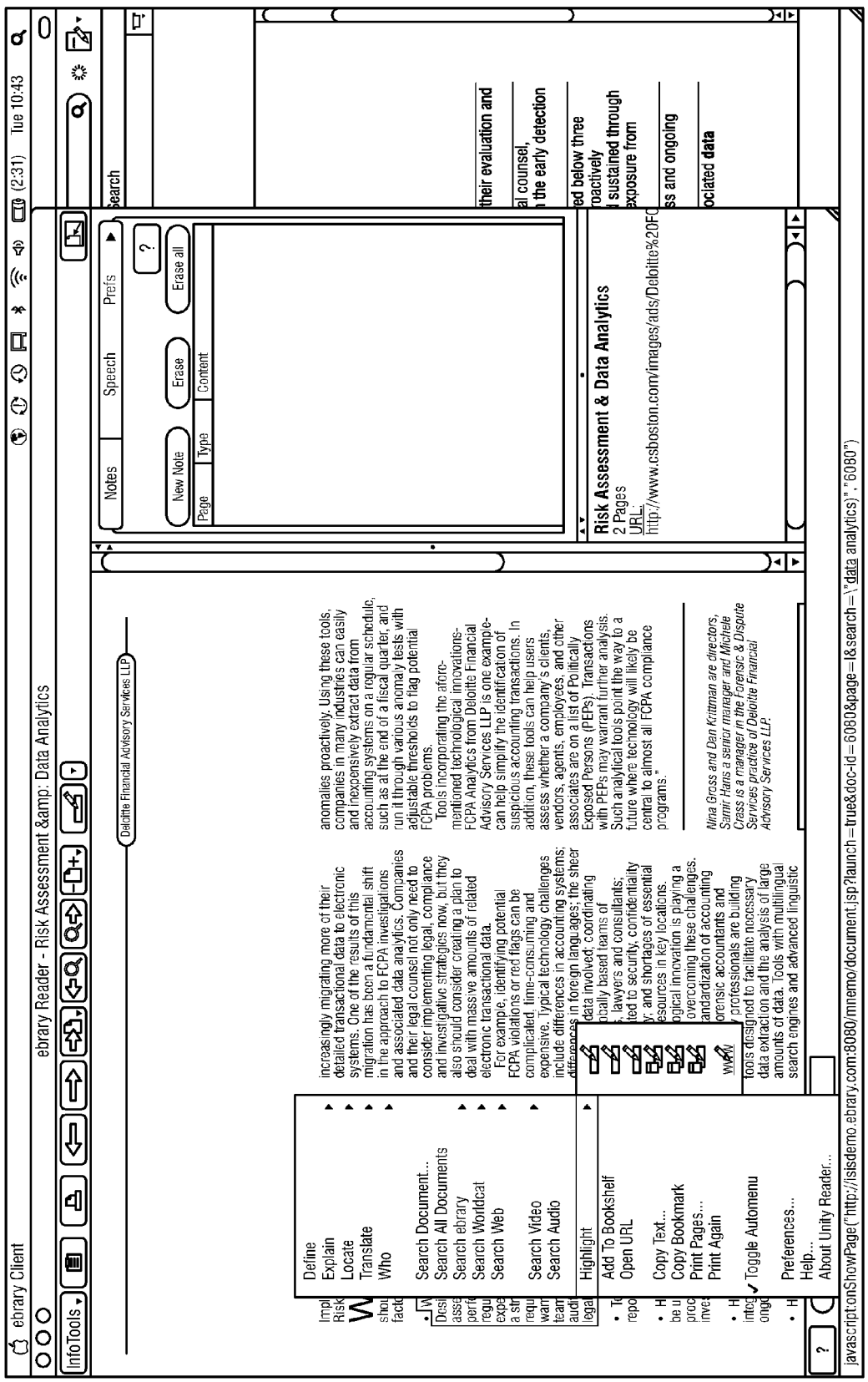
Figure 19:
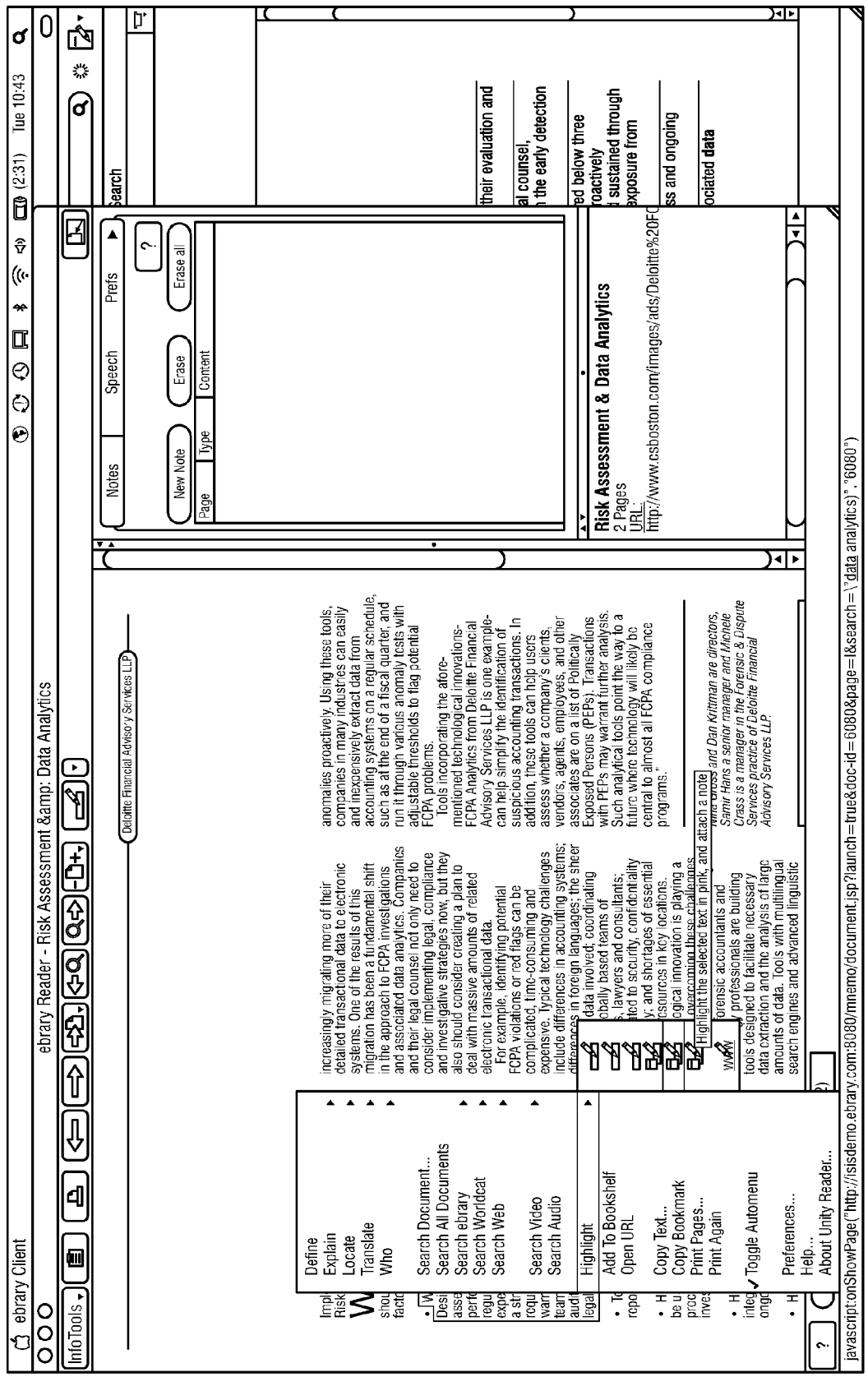
Figure 20:
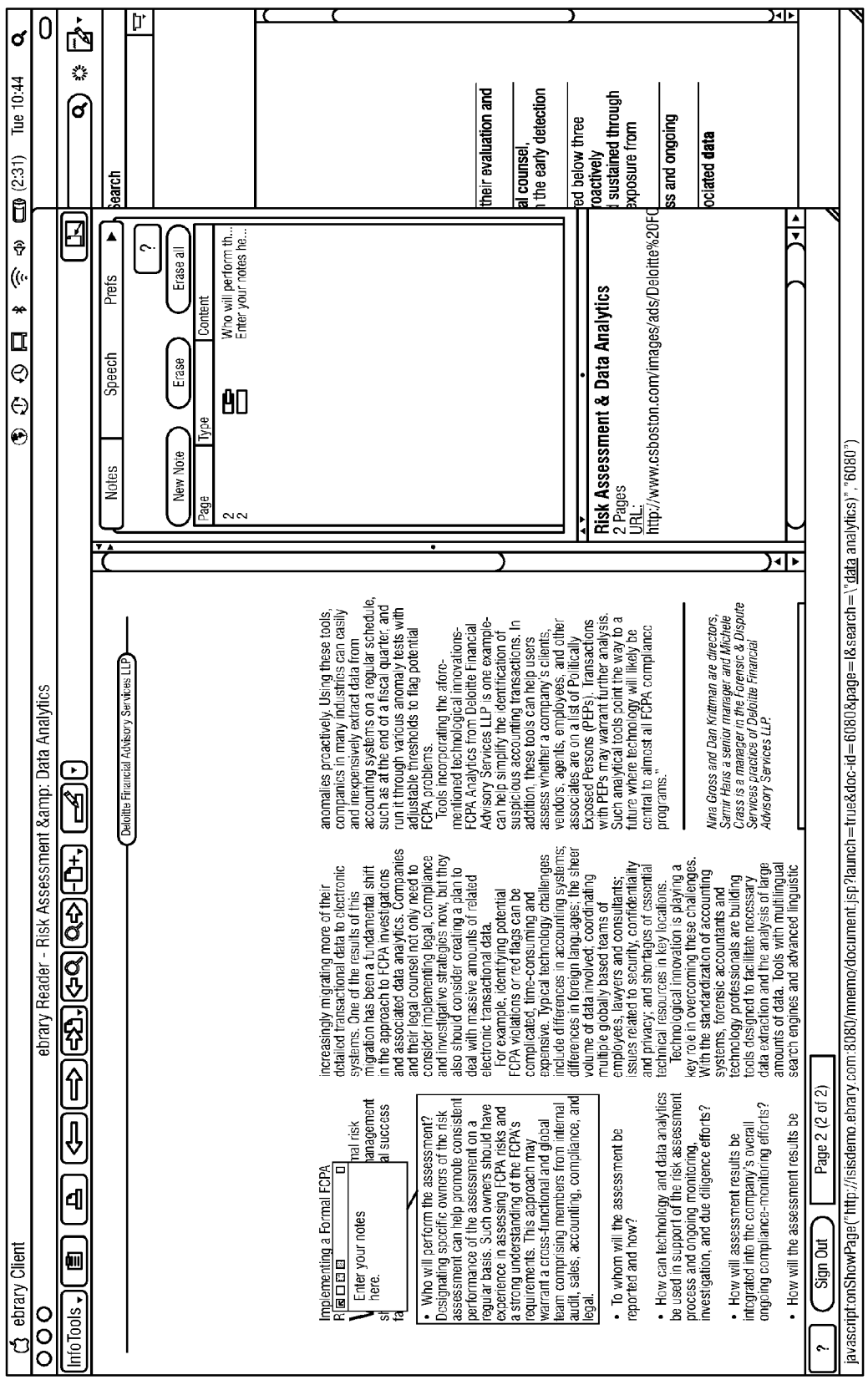

An embodiment of a text analysis and text navigation usage flow using multiple documents from one or more collections can be described below with reference to FIG. 12-FIG. 20. FIG. 12 shows a list of user accounts. FIG. 13 shows an opened account, Warnock, and a set, Warnock/Data Analytics, is selected. The right hand side shows a list of phrases and their number of occurrences found in the documents contained in the selected set. The list is ordered according to a predetermined criterion, such as the greatest number of occurrences. FIG. 14 shows that user has selected the phrase, data analytics (6), which is shown as highlighted. As well, FIG. 14 shows that upon selection of the phrase, data analytics, the sentences which contain such phrase are retrieved from distilled data set 106 and displayed. As well, each instance of the phrase, data analytics, is highlighted in the displayed sentence. FIG. 15 shows that the user has opened the set, Warnock/Data Analytics, which then shows the list of titles contained in the set. It should be appreciated that each title is shown as marked (x is checked) to indicate that such title was includes in the search. As well, FIG. 15 shows that, in this example, only the last document, Risk Assessment & Data Analytics, contained the phrase, data analytics. FIG. 16 shows the result of the user selecting a particular sentence within the list of sentences. The page, containing the first instance of the phrase, of the document which contained the sentence, Risk Assessment & Data Analytics, is presented in a new window. The phrase is shown highlighted in the displayed page of the document. FIG. 17 shows the second page (Page 2 (2 of 2)) containing the phrase. The phrase is highlighted in the second page, as well. FIG. 18 shows some text was highlighted and an editing tool, Highlight, is used on the document. FIG. 19 shows that the color pink for the highlight is selected. FIG. 20 shows the selected text is highlighted in pink and an text box linked to the highlighted text is presented to the user to write a note. FIG. 20 also shows a list of notes containing previously saved notes by the user.

A First Example Use Case for Multiple Documents

An example of a use case according to an embodiment is described hereinbelow.

Sign-in:
  1. A user signs into his or her account.

Acquire Content:
  1. The user goes to the user interface, e.g. submission interface 102, and is greeted with a choice of search engines (from a predetermined list) with which to conduct their search. Example of search engines may be Google, Google Scholar, IHS, Proquest, Society of Petroleum Engineers and other such collections to which user's account has access.
  2. The user enters a query (search terms) into search field and starts the search.
  3. The Server then:
     a. Provides the user with status information regarding the progress about the following.
     b. Sends (modified) queries to the target search engine site(s).
     c. Search results are processed to find text files, e.g. the PDF files, representing the results and, when possible, the title of the document and any other available metadata.
     d. Documents are added to a new user collection or view, e.g. at browser 108.
     e. As server processes data, user is presented with search results. Such search results were derived from the server using any site data, document information, and the words and phrases information resulting from the server's successful processing of the files. Such presented search results may be stored as a set. Such saved set may be available for sharing as in a shared set or may be private and only available to the user.
f. Content, e.g. set content data, may be submitted to distillate engine 104 for storage in distillate data set 108 for future use.
g. Any errors detected (search server unreachable, text files unreachable/missing, text files not indexable/badly formatted) are reported.

Exploration Opportunities for User:
1. The user is presented with a search result page or view displaying the acquired titles from the selected target databases along with the word/phrase interface described above.
2. The user will also be able to search this content corresponding to the titles as well.
3. The user may select a word or phrase on the interface. When a word or phrase is selected related sentences along with preceding and anteceding words are displayed.
4. The list on the left displays the count of the occurrences of the selected word or phrase within that document.
5. The user selects/deselects documents from title list to expand/restrict the display on the interface. The user may also choose to discard documents from the title list.
6. If the user selects a document, the user is sent to the first occurrence of the selected word or phrase within that document.
7. If the user selects a sentence the user is sent to the page containing the selected document showing that sentence highlighted.

Integrate and Operate:
1. The user may then highlight or annotate the document. Highlights and annotations are stored in the user's personal bookshelf. Any books that get highlighted are retained by the system indefinitely.
2. The user may then use search tools to work with the document collection as well as within document.
3. A user may search within book as well as search within the collection.
4. The user may then use annotation tools (Highlight, Notes and bookshelf folders) on the book or documents within the collection.

Alternate Embodiments

1. A customer can easily upload and share content with some or all of its users. Content is uploaded via HTML web page as links to PDF or by pointing to a local file directory of PDF.
2. End users easily can submit content into the system from their hard disk or from the Web.
3. End users can designate the content either for inclusion in a single public collection managed by the institutional customer, or as limited for personal search and retrieval, in a single personal collection.
4. Content can be organized in local collections stored in a remote repository.

A Second Example Use Case for Multiple Documents

Following is an example use case for multiple documents according to an embodiment. Such example is for illustrative purposes only and is not meant to be limiting.

User selects search engines to query from a predetermined list of 5 search engines: i.e. Google, Google Scholar, IHS, Proquest, Society of Petroleum Engineer.
User enters query into search window.
User enters "return".
Server modifies search queries for target sites to be limited to documents in PDF format.
Server sends query to target sites.
Target sites send search results to server.
Search results are processed may include using spider search engine techniques and the like.
Server processes files, adding metadata information available from search results data.
Documents are added to a collection by the same name as the query and associated with a specific query.
As server processes data, user is presented with "search results" where the server takes the site data, document information, and the words and phrases information resulting from the server's successful processing of the files and presents it to the user.
User is presented with a combined search result displaying the title search results from the selected target databases; User is also presented with a distillate browser interface, which is a list of words/phrases extracted from the returned documents.
The user may select a word or phrase in the distillate browser, when a word or phrase is selected then distillate browser activities ensue, such as display of sentences and preceding and anteceding words. As well, a document list displays the number of occurrences of the selected word or phrase within that document.
The user may select documents from the title list and look at the text contained just within those documents within the distillate browser.
The user may also choose to discard documents on the display.
If the user selects a document, the user is sent to the first occurrence of the selected word or phrase within that document.
If the user selects a sentence, the user is sent to the page containing the selected document and the title within the list that contains the sentence is highlighted.
When the user is signed into the system, he/she may highlight or annotate the text within the document.
The highlighted or annotated text within that document is stored in the user's bookshelf account.

Sets in a Distributed Environment

Figure 21:
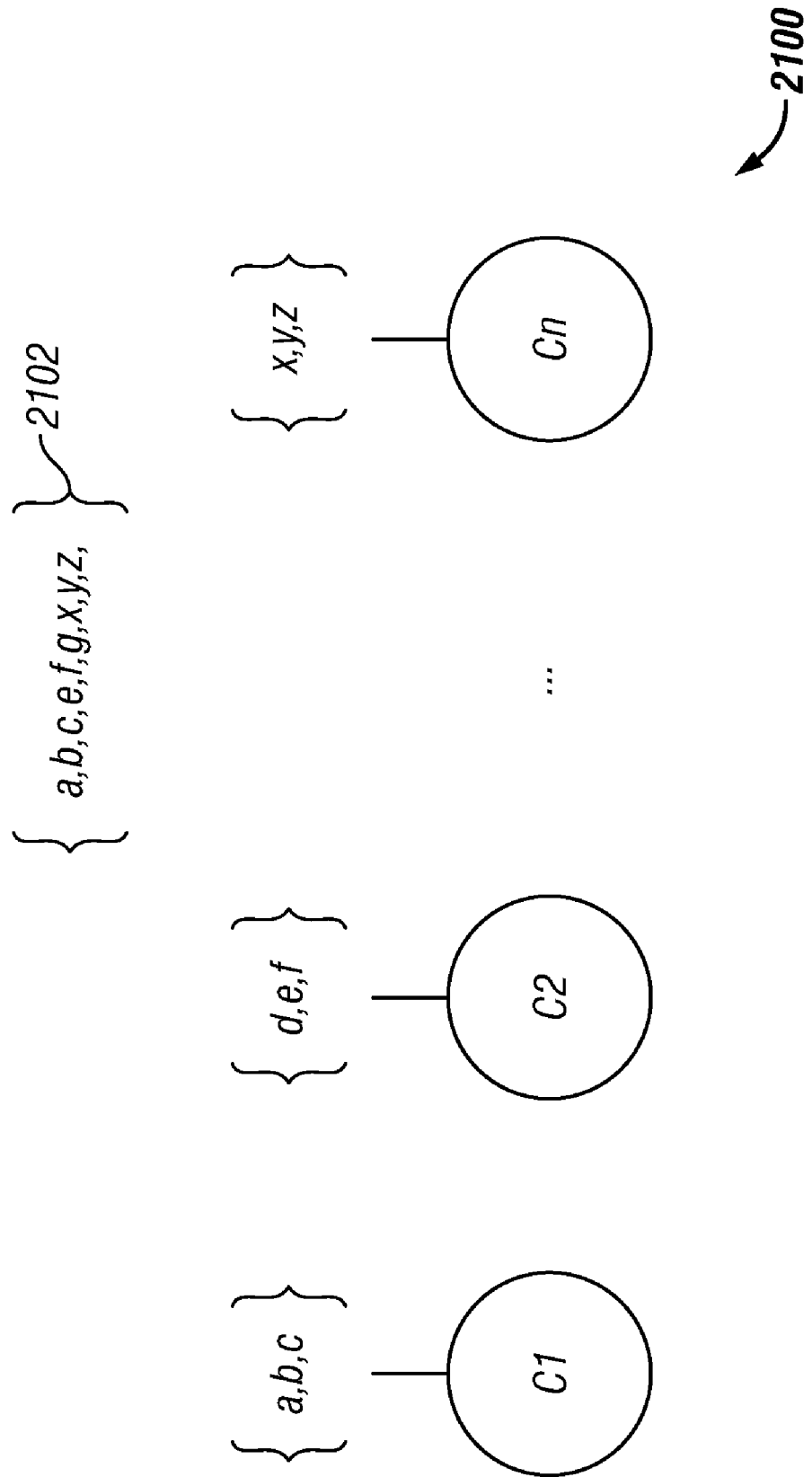
FIG. 21 is a schematic diagram showing creating a new document from a view of text from one or more collections according to an embodiment.

In an embodiment, a set can represent two or more documents from different collections. Referring to FIG. 21, documents {a, b, c} are selected from collection C1, documents {e, d, f} are selected from collection C2, and documents {x, y, z} are selected from collection Cn 2100. The result of such selection or view is a new document 2102, {a, b, c, d, e, f, x, y, z}. It should be appreciated that such new document may be saved and stored in persistent memory on a server or temporarily stored in virtual memory, etc. As well, information about the new document can be sent to another user, e.g. in the user's Bookshelf application, and can be recreated for another user.

Building a Memory

In an embodiment, the collection management system and process or text analysis and text navigation system 100 described above can be viewed as building elasticity or memory. The system and process builds a memory of documents. Information that may be relevant to a user can be recalled in real time.

Modularity

In an embodiment, particular elements of each of submission interface 102, distillate engine 104, distillate data set 106, distillate browser 108, and one or more collections 110*a*-

110d are modular. That is, each element within any of such components mentioned above is self-contained and can be replaced by other implementations without destroying the functionality of the system 100 as a whole. That is, such particular elements have a plug-in and play characteristic.

An Example Machine Overview

Figure 22:
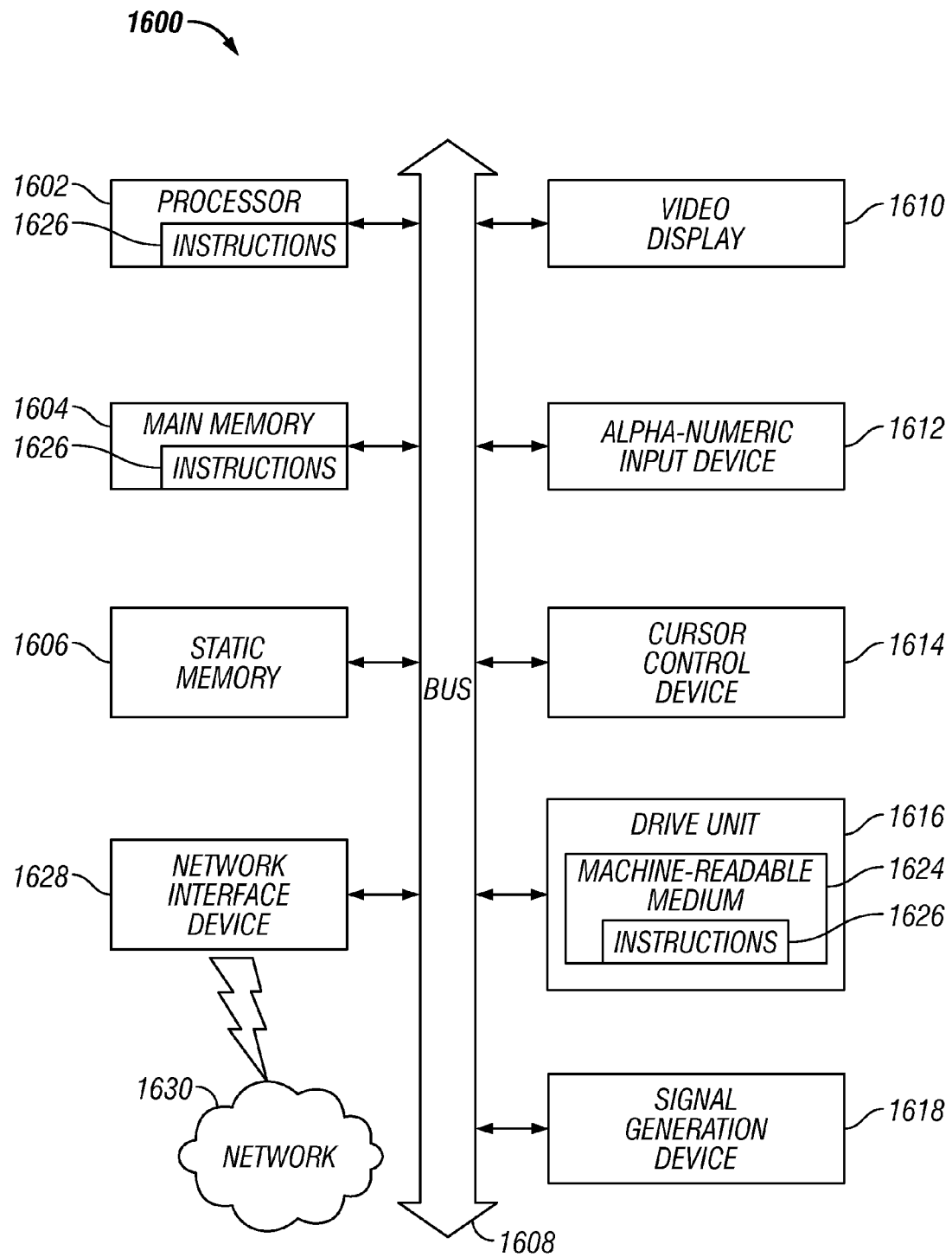
FIG. 22 is a block schematic diagram of a machine in the exemplary form of a computer system within which a set of instructions may be programmed to cause the machine to execute the logic steps of the invention.

FIG. 22 is a block schematic diagram of a machine in the exemplary form of a computer system 1600 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infra-red signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A system comprising:
   a submission interface configured for accessing and retrieving one or more selected documents from one or more target repositories,
      wherein a repository is any of: a local database, a remote database, a distributed database, and a web server, and
      wherein said submission interface creates and sends a search query to each of said target repositories in a format compatible with said each target repository;
   a distillate engine configured for retrieving said one or more selected documents from said submission interface and for comprising a plurality of processors for performing a plurality of processes on said retrieved selected documents, said plurality of processors comprising:
      a removing stop word processor, wherein said removing stop word processor is instructed to perform the steps of:
         for each document of said retrieved selected documents, identifying stop words within the document by comparing words in the document to a list of stop words and removing the identified stop words from the document, wherein a stop word is any of: if, and, but;
      a word list generator processor, wherein said word list generator processor is instructed to perform the steps of:
         for said document in which stop words were removed, for each remaining word, identifying the page and the location of the remaining word within said page and saving said identified information as a page-word number pair and said remaining words in a distillate data set;
      a word stemming processor, wherein said word stemming processor is instructed to perform the steps of:
         responsive to generating the distillate set, identifying words from the distillate set that have stems based on a file containing a list of stems, and creating a reduced set of words by not considering, from said words in said distillate set, words with stems in particular further processes, wherein a stem comprises at least any of: ly, and ing;
      a word subordination processor, wherein said word subordination processor is instructed to perform the steps of:
         identifying, in the reduced set of words, subsumed words and parents words;
         further reducing the set of reduced words for post-processing by removing said subsumed words;
         adding the number of occurrences of each subsumed word to the number of occurrences of the parent word; and
         wherein a subsumed word is a particular word that contains a same string as a parent word and that occurs in the document a number of times that is lower than a predetermined threshold percentage of occurrences of said parent word,
      a statistical analysis processor, wherein said statistical analysis processor is instructed to perform the steps of:
         determining relative ranking of the words from the set of reduced words by the word subordination processor, based on any of: occurrence of words and density of words in a particular portion of said document;

a sentence identifying processor, for identifying every sentence in said selected document and assigning each sentence a sentence id;

an index generator processor, wherein said index generator processor is instructed to perform the steps of:
for each page-word number pair in said distillate set, associating a sentence from the identified sentences which contain said word of said page-word pair, generating a mapping of said word to said sentence based, in part, on generating a word id of the word based on the sentence id of the sentence, and saving the results in an index in said distillate set;

a phrase extraction processor, wherein said phrase extraction processor is instructed to perform the steps of:
requesting said list of words from said distillate data set in an order according to a criteria that reflects a particular relevancy of the document, said criteria comprising any of: frequency, density, or alphabetical;
for each word of said requested list of words, requesting from said distillate data set a list of every sentence in which said word occurs;
for each sentence, parsing said sentence based on said word to generate a data tree, wherein each node in said tree is a particular word in said sentence and each child node is a word that follows said particular word in said sentence;
traversing said data tree to identify thickest branches and based on the identified thickest branches, identifying significant phrases and their number of occurrences in said sentence;
saving said significant phrases and their number of occurrences in said distillate data set and saving a mapping of said significant phrases to their associated sentences in said index; and a distillate browser configured for presenting, in response to a user request to view one or more documents of said one or more selected documents, one or more views of data associated with said one or more documents from said distillate data set in an interactive display of words, phrases, statistical information of said words and phrases, sentences that are mapped to said words, and sentences that are mapped to said phrases;

wherein said distillate browser further comprises a query input for entering key words, which query is sent via one or more API calls to said distillate data set, said API based on at least said index.

2. The system of claim 1, wherein said index comprises locations of words, phrases, sentences, paragraphs and page information of said document.

3. The system of claim 1, wherein said distillate browser is further configured for:
a user to select any of: a word, phrase, a selection of multiple words, and a selection of multiple phrases, and for
presenting on a display any of:
said selected word(s), the words that precede the selected word(s), the words that are antecedent to the selected word(s), and sentences in which said selected word(s) occurs, and
said selected phrase(s), the words that precede the selected phrase(s), the words that are antecedent to the selected phrase(s), and sentences in which said selected phrase(s) occurs.

4. The system of claim 1, wherein said distillate browser is further configured to save a particular view of said one or more views as a set for subsequent access.

5. The system of claim 4, wherein said set is a new document that is created from text from two or more documents from different collections without opening any of said two or more documents.

6. A computer-implemented method comprising the steps of:
accessing and retrieving, by a submission interface, one or more selected documents from one or more target repositories,
wherein a repository is any of: a local database, a remote database, a distributed database, and a web server, and
wherein said submission interface creates and sends a search query to each of said target repositories in a format compatible with said each target repository;
retrieving, by a distillate engine, said one or more selected documents from said submission interface and performing a plurality of processes on said retrieved, selected documents, said plurality of processes comprising:
instructing a removing stop word processor to perform the steps of:
for each document of said retrieved selected documents, identifying stop words within the document by comparing words in the document to a list of stop words and removing the identified stop words from the document, wherein a stop word is any of: if, and, but;
instructing a word list generator to perform the steps of:
for said document in which stop words were removed, for each remaining word, identifying the page and the location of the remaining word within said page and saving said identified information as a page-word number pair and said remaining words in a distillate data set;
instructing a word stemming processor to perform the steps of:
responsive to generating the distillate set, identifying words from the distillate set that have stems based on a file containing a list of stems, and creating a reduced set of words by not considering, from said words in said distillate set, words with stems in particular further processes, wherein a stem comprises at least any of: ly, and ing;
instructing a word subordination processor to perform the steps of:
identifying, in the reduced set of words, subsumed words and parents words;
further reducing the set of reduced words for post-processing by removing said subsumed words;
adding the number of occurrences of each subsumed word to the number of occurrences of the parent word; and
wherein a subsumed word is a particular word that contains a same string as a parent word and that occurs in the document a number of times that is lower than a predetermined threshold percentage of occurrences of said parent word;
instructing a statistical analysis processor to perform the steps of:
determining relative ranking of the words from the set of reduced words by the word subordination processor, based on any of: occurrence of words and density of words in a particular portion of said document;

instructing a sentence identifying processor to identify every sentence in said selected document and assign each identified sentence a sentence id;
instructing an index generator to perform the steps of:
for each page-word number pair in said distillate set,
associating a sentence from the identified sentences which contain said word of said page-word pair,
generating a mapping of said word to said sentence based, in part, on generating a word id of the word based on the sentence id of the sentence, and
saving the results in an index in said distillate set;
instructing a phrase extraction processor to perform the steps of:
requesting said list of words from said distillate data set in an order according to a criteria that reflects a particular relevancy of the document, said criteria comprising any of: frequency, density, or alphabetical;
for each word of said requested list of words, requesting from said distillate data set a list of every sentence in which said word occurs;
for each sentence, parsing said sentence based on said word to generate a data tree, wherein each node in said tree is a particular word in said sentence and each child node is a word that follows said particular word in said sentence;
traversing said data tree to identify thickest branches and based on the identified thickest branches, identifying significant phrases and their number of occurrences in said sentence;
saving said significant phrases and their number of occurrences in said distillate data set and saving a mapping of said significant phrases to their associated sentences in said index;
in response to a user action requesting to view one or more documents of said one or more selected documents, instructing a distillate browser to present one or more views of data associated with said one or more documents from said distillate data set in an interactive display of words, phrases, statistical information of said words and phrases, sentences that are mapped to said words, and sentences that are mapped to said phrases;
wherein said distillate browser further comprises a query input for entering key words, which query is sent via one or more API calls to said distillate data set, said API based on at least said index.

7. The computer-implemented method of claim 6, wherein said index comprises locations of words, phrases, sentences, paragraphs and page information of said document.

8. The computer-implemented method of claim 6, wherein said distillate browser is further configured for:
a user to select any of: a word, phrase, a selection of multiple words, and a selection of multiple phrases, and
for presenting on a display any of:
said selected word(s), the words that precede the selected word(s), the words that are antecedent to the selected word(s), and sentences in which said selected word(s) occurs, and
said selected phrase(s), the words that precede the selected phrase(s), the words that are antecedent to the selected phrase(s), and sentences in which said selected phrase(s) occurs.

9. The computer-implemented method of claim 6, wherein said distillate browser is further configured to save a particular view of said one or more views as a set for subsequent access.

10. The computer-implemented method of claim 9, wherein said set is a new document that is created from text from two or more documents from different collections without opening any of said two or more documents.

* * * * *